(12) United States Patent
Balakrishnan et al.

(10) Patent No.: US 10,153,687 B2
(45) Date of Patent: Dec. 11, 2018

(54) METHOD AND APPARATUS FOR IMPLEMENTING A POWER CONVERTER INPUT TERMINAL VOLTAGE DISCHARGE CIRCUIT

(71) Applicant: Power Integrations, Inc., San Jose, CA (US)

(72) Inventors: Balu Balakrishnan, Saratoga, CA (US); David Kung, Foster City, CA (US); Raymond Kenneth Orr, Kanata (CA); David Michael Hugh Matthews, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/640,005

(22) Filed: Jun. 30, 2017

(65) Prior Publication Data

US 2017/0302156 A1   Oct. 19, 2017

Related U.S. Application Data

(63) Continuation of application No. 14/717,620, filed on May 20, 2015, now Pat. No. 9,735,665, which is a
(Continued)

(51) Int. Cl.
*H02J 7/00* (2006.01)
*H02M 1/32* (2007.01)
(Continued)

(52) U.S. Cl.
CPC ............... *H02M 1/32* (2013.01); *H02M 1/12* (2013.01); *H02M 1/126* (2013.01); *H02M 1/36* (2013.01); *H02M 2001/322* (2013.01)

(58) Field of Classification Search
USPC ........................................................ 320/166
See application file for complete search history.

(56) References Cited

U.S. PATENT DOCUMENTS

| 2,451,632 | A | 10/1948 | Oliver |
| 2,770,531 | A | 11/1956 | Hawes et al. |
(Continued)

FOREIGN PATENT DOCUMENTS

| CN | 101465548 A | 6/2009 |
| DE | 4218832 A1 | 12/1993 |
(Continued)

OTHER PUBLICATIONS

Indian Patent Application No. 1627/DEL/2010—Examination Report dated May 16, 2018, 5 pages.
(Continued)

*Primary Examiner* — Arun C Williams
(74) *Attorney, Agent, or Firm* — Christensen O'Connor Johnson Kindness PLLC

(57) ABSTRACT

A power converter includes an energy transfer element and a circuit coupled to the input of the power converter. The circuit includes a switch and a control circuit capable of detecting whether an AC voltage source is coupled to the input, or uncoupled from the input within a first predetermined time. The control circuit is coupled to drive the switch in a first operating mode when the AC voltage source is coupled, drive the switch in a second operating mode when the AC voltage source is uncoupled, and is capable of discharging a capacitance coupled between input terminals of the power converter to a threshold voltage level through a discharge path and through the switch within a second predetermined time. An RC time constant of the discharge path is less than or equal to one second and the threshold voltage level is less than or equal to ten volts.

20 Claims, 13 Drawing Sheets

Related U.S. Application Data continuation of application No. 14/100,882, filed on Dec. 9, 2013, now Pat. No. 9,065,340, which is a continuation of application No. 13/345,257, filed on Jan. 6, 2012, now Pat. No. 8,624,562, which is a continuation of application No. 12/533,977, filed on Jul. 31, 2009, now Pat. No. 8,115,457.

(51) Int. Cl.
  *H02M 1/12*   (2006.01)
  *H02M 1/36*   (2007.01)

(56) References Cited

U.S. PATENT DOCUMENTS

| | | | |
|---|---|---|---|
| 2,833,963 | A | 5/1958 | Tognola |
| 4,567,539 | A | 1/1986 | Sinberg |
| 4,667,173 | A | 5/1987 | Okochi |
| 4,769,685 | A | 9/1988 | MacIver et al. |
| 4,855,722 | A | 8/1989 | Mostyn et al. |
| 5,008,794 | A | 4/1991 | Leman |
| 5,061,913 | A | 10/1991 | Okochi et al. |
| 5,072,268 | A | 12/1991 | Rumennik |
| 5,164,891 | A | 11/1992 | Keller |
| 5,179,362 | A | 1/1993 | Okochi et al. |
| 5,258,636 | A | 11/1993 | Rumennik et al. |
| 5,274,259 | A | 12/1993 | Grabowski et al. |
| 5,285,367 | A | 2/1994 | Keller |
| 5,285,369 | A | 2/1994 | Balakrishnan |
| 5,313,082 | A | 5/1994 | Eklund |
| 5,313,381 | A | 5/1994 | Balakrishnan |
| 5,323,044 | A | 6/1994 | Rumennik et al. |
| 5,411,901 | A | 5/1995 | Grabowski et al. |
| 5,461,303 | A | 10/1995 | Leman et al. |
| 5,563,493 | A | 10/1996 | Matsuda et al. |
| 5,999,429 | A | 12/1999 | Brown |
| 6,049,178 | A | 4/2000 | Sheu et al. |
| 6,084,277 | A | 7/2000 | Disney et al. |
| 6,107,851 | A | 8/2000 | Balakrishnan et al. |
| 6,168,983 | B1 | 1/2001 | Rumennik et al. |
| 6,207,994 | B1 | 3/2001 | Rumennik et al. |
| 6,259,618 | B1 | 7/2001 | Liaw et al. |
| 6,424,007 | B1 | 7/2002 | Disney |
| 6,424,125 | B1 | 7/2002 | Graham |
| 6,456,044 | B1 | 9/2002 | Darmawaskita |
| 6,465,291 | B1 | 10/2002 | Disney |
| 6,468,847 | B1 | 10/2002 | Disney |
| 6,489,190 | B2 | 12/2002 | Disney |
| 6,501,130 | B2 | 12/2002 | Disney |
| 6,504,209 | B2 | 1/2003 | Disney |
| 6,509,220 | B2 | 1/2003 | Disney |
| 6,552,597 | B1 | 4/2003 | Disney |
| 6,555,873 | B2 | 4/2003 | Disney et al. |
| 6,555,883 | B1 | 4/2003 | Disney et al. |
| 6,563,171 | B2 | 5/2003 | Disney |
| 6,570,219 | B1 | 5/2003 | Rumennik et al. |
| 6,573,558 | B2 | 6/2003 | Disney |
| 6,583,663 | B1 | 6/2003 | Disney |
| 6,633,065 | B2 | 10/2003 | Rumennik et al. |
| 6,635,544 | B2 | 10/2003 | Disney |
| 6,639,277 | B2 | 10/2003 | Rumennik et al. |
| 6,667,213 | B2 | 12/2003 | Disney |
| 6,680,646 | B2 | 1/2004 | Disney |
| 6,683,344 | B2 | 1/2004 | Tsukanov et al. |
| 6,724,041 | B2 | 4/2004 | Rumennik et al. |
| 6,730,585 | B2 | 5/2004 | Disney |
| 6,734,714 | B2 | 5/2004 | Disney |
| 6,750,105 | B2 | 6/2004 | Disney |
| 6,759,289 | B2 | 7/2004 | Disney |
| 6,768,171 | B2 | 7/2004 | Disney |
| 6,768,172 | B2 | 7/2004 | Rumennik et al. |
| 6,777,749 | B2 | 8/2004 | Rumennik et al. |
| 6,781,198 | B2 | 8/2004 | Disney |
| 6,787,437 | B2 | 9/2004 | Rumennik et al. |
| 6,787,847 | B2 | 9/2004 | Disney |
| 6,798,020 | B2 | 9/2004 | Disney et al. |
| 6,800,903 | B2 | 10/2004 | Rumennik et al. |
| 6,813,170 | B2 | 11/2004 | Yang |
| 6,815,293 | B2 | 11/2004 | Disney et al. |
| 6,818,490 | B2 | 11/2004 | Disney |
| 6,825,536 | B2 | 11/2004 | Disney et al. |
| 6,828,631 | B2 | 12/2004 | Rumennik et al. |
| 6,838,346 | B2 | 1/2005 | Disney |
| 6,865,093 | B2 | 3/2005 | Disney |
| 6,882,005 | B2 | 4/2005 | Disney |
| 6,987,299 | B2 | 1/2006 | Disney et al. |
| 7,046,529 | B2 | 5/2006 | Chang |
| 7,115,958 | B2 | 10/2006 | Disney et al. |
| 7,135,748 | B2 | 11/2006 | Balakrishnan |
| 7,220,629 | B2 | 5/2007 | Balakrishnan |
| 7,221,011 | B2 | 5/2007 | Banerjee et al. |
| 7,253,042 | B2 | 8/2007 | Disney |
| 7,253,059 | B2 | 8/2007 | Balakrishnan |
| 7,335,944 | B2 | 2/2008 | Banerjee et al. |
| 7,355,831 | B2 | 4/2008 | Raiser |
| 7,381,618 | B2 | 6/2008 | Disney |
| 7,391,088 | B2 | 6/2008 | Balakrishnan |
| 7,397,680 | B2 | 7/2008 | Odell |
| 7,459,366 | B2 | 12/2008 | Banerjee et al. |
| 7,468,536 | B2 | 12/2008 | Parthasarathy |
| 7,492,614 | B2 | 2/2009 | Furukoshi et al. |
| 7,494,875 | B2 | 2/2009 | Disney |
| 7,505,290 | B2 | 3/2009 | Fujiwara |
| 7,557,406 | B2 | 7/2009 | Parthasarathy et al. |
| 7,585,719 | B2 | 9/2009 | Balakrishnan |
| 7,595,523 | B2 | 9/2009 | Parthasarathy et al. |
| 7,648,879 | B2 | 1/2010 | Banerjee et al. |
| 7,733,678 | B1 | 6/2010 | Notohamiprodjo et al. |
| 7,745,291 | B2 | 6/2010 | Disney |
| 7,786,533 | B2 | 8/2010 | Disney |
| 7,791,132 | B2 | 9/2010 | Banerjee et al. |
| 7,816,731 | B2 | 10/2010 | Parthasarathy et al. |
| 7,829,944 | B2 | 11/2010 | Disney |
| 7,871,882 | B2 | 1/2011 | Parthasarathy et al. |
| 7,939,853 | B2 | 5/2011 | Murphy et al. |
| 7,964,912 | B2 | 6/2011 | Parthasarathy et al. |
| 7,998,817 | B2 | 6/2011 | Disney |
| 8,022,456 | B2 | 9/2011 | Parthasarathy et al. |
| 8,076,723 | B2 | 12/2011 | Parthasarathy et al. |
| 8,093,621 | B2 | 1/2012 | Parthasarathy et al. |
| 8,097,512 | B2 | 1/2012 | Li et al. |
| 8,207,577 | B2 | 1/2012 | Banerjee et al. |
| 8,115,457 | B2 | 2/2012 | Balakrishnan et al. |
| 8,339,192 | B2 | 12/2012 | Busch |
| 8,369,051 | B2 | 2/2013 | Skatulla |
| 8,461,915 | B2 | 6/2013 | Huang et al. |
| 8,624,562 | B2 | 1/2014 | Balakrishnan et al. |
| 9,065,340 | B2 | 6/2015 | Balakrishnan et al. |
| 2002/0131135 | A1* | 9/2002 | Chow ............... G02B 6/4202 398/202 |
| 2002/0175770 | A1* | 11/2002 | Cyrusian ............ G11C 5/147 331/17 |
| 2003/0111909 | A1* | 6/2003 | Liu ..................... H02J 1/102 307/64 |
| 2004/0090736 | A1 | 5/2004 | Bendale et al. |
| 2005/0167749 | A1 | 8/2005 | Disney |
| 2005/0248968 | A1 | 11/2005 | Chang |
| 2006/0050448 | A1 | 3/2006 | Krug |
| 2007/0194759 | A1 | 8/2007 | Shimizu et al. |
| 2007/0247879 | A1 | 10/2007 | Yang |
| 2008/0067946 | A1 | 3/2008 | Simonsen et al. |
| 2008/0278117 | A1 | 11/2008 | Tarchinski |
| 2009/0009145 | A1 | 1/2009 | Odajima et al. |
| 2009/0012739 | A1 | 1/2009 | Flett |
| 2009/0015318 | A1 | 1/2009 | Honda |
| 2009/0033294 | A1 | 2/2009 | Odajima et al. |
| 2009/0082882 | A1 | 3/2009 | Parfitt |
| 2009/0121739 | A1 | 5/2009 | Kuo |
| 2009/0153123 | A1 | 6/2009 | Kraft |
| 2009/0174386 | A1 | 7/2009 | Popescu et al. |
| 2009/0256606 | A1* | 10/2009 | Matsumoto .......... H03K 5/082 327/172 |
| 2009/0261787 | A1 | 10/2009 | Cegnar et al. |
| 2009/0315401 | A1 | 12/2009 | Yoshida et al. |

(56) References Cited

U.S. PATENT DOCUMENTS

| | | |
|---|---|---|
| 2009/0315518 A1 | 12/2009 | Soma et al. |
| 2009/0315521 A1 | 12/2009 | Watanabe |
| 2011/0073942 A1 | 3/2011 | Banerjee et al. |
| 2011/0175579 A1 | 7/2011 | Mazumdar |
| 2012/0273885 A1 | 11/2012 | Banerjee et al. |
| 2014/0097803 A1 | 4/2014 | Balakrishnan et al. |

FOREIGN PATENT DOCUMENTS

| | | | |
|---|---|---|---|
| DE | 10 2007 022 515 A1 | 11/2008 | |
| EP | 0 325 126 A1 | 7/1989 | |
| EP | 0 325 136 A1 | 7/1989 | |
| EP | 1 819 032 A1 | 8/2007 | |
| EP | 2267875 A2 | 12/2010 | |
| JP | H 10-185965 | 7/1998 | |
| JP | H 10-185965 A | 7/1998 | |
| JP | H 11-164555 | 6/1999 | |
| JP | 2000-184718 A | 6/2000 | |
| JP | 2000-206159 | 7/2000 | |
| JP | 2001-306160 | 11/2001 | |
| JP | 2001-306160 A | 11/2001 | |
| JP | 2007 236166 A | 9/2007 | |
| JP | 2007-282364 A | 10/2007 | |
| JP | 2011-36124 A | 2/2011 | |
| WO | WO 2008/086891 A1 | 7/2008 | |

OTHER PUBLICATIONS

European Patent Application No. 10 171 317.0-1201—Office Action dated May 30, 2018, 7 pages.
IPR2016-01595—Decision: Institution of Inter Partes Review, entered Feb. 17, 2017, 32 pages.
CN 201010245531.9—Third Chinese Office Action, dated Mar. 17, 2014, with English Translation (7 pages).
JP 2010-172595—Japanese Office Action, dated Jul. 8, 2014, with English Translation (4 pages).
CN Patent Application No. 201010501595.0—First Office Action, dated Jun. 5, 2012, with English Translation (7 pages).
EP 13154653.3—Extended European Search Report, dated Jan. 2, 2014 (7 pages).
EP 13154801.8—Extended European Search Report, dated Jan. 8, 2014 (8 pages).
EP 10171317.0—European Office Action, dated Feb. 25, 2015 (4 pages).
JP 2010-172595—Japanese Office Action, dated Apr. 7, 2015, with English Translation (6 pages).
JP 2010-172595—Japanese Office Action, dated Jan. 5, 2016, with English Translation (4 pages).
EP 10171317.0—European Office Action, dated Oct. 26, 2015 (4 pages).
CN 201410406355.0—First Chinese Office Action and Search Report, dated Jun. 2, 2016, with English Machine Translation (17 pages).
CN 201410406355.0—Second Chinese Office Action, dated Feb. 24, 2017, with English Machine Translation (13 pages).
Motorola Data Sheet for Part No. MC33362, "High Voltage Switching Regulator", Rev. 2, © Motorola, Inc. 1996, 12 pages.
Atmel Product Data Sheet for T83C5101, T87C5101, & T83C5102, "8-Bit Low Pin Count Microcontrollers", © 2008 Atmel Corporation, 58 pages.
Hsieh, H-I et al., "Effects of X Capacitors on EMI Filter Effectiveness", IEEE Transactions on Industrial Electronics, vol. 55, No. 2, Feb. 2008, © 2008, pp. 949-955.
Erickson, R. W., "Fundamentals of Power Electronics", Kluwer Academic Publishers, Norwell, MA, © 1997, 38 pages.
Kassakian, J. G. et al., "Principles of Power Electronics", © 1991 by Addison-Wesley Publishing Company, Inc., reprinted with corrections Jun. 1992, 5 pages.
Mammano, B. et al., 2004/05 Power Supply Design Seminar, Texas Instruments, Mammano, B. et al., "Safety Considerations in Power Supply Design" © 2005, Texas Instruments Incorporated, 191 pages.
IPR2016-01594—Decision: Institution of Inter Partes Review, entered Feb. 17, 2017, 30 pages.
European Patent Application No. 13 154 653.3-1809—Office Action dated Dec. 5, 2017, 6 pages.
European Patent Application No. 13 154 801.1-1809—Office Action dated Dec. 5, 2017, 4 pages.
EP 10 17 1317—European Search Report, dated Dec. 22, 2010 (3 pages).
EP 10 17 1317—European Office Action, dated Feb. 10, 2011 (6 pages).
KR 10-2010-93846—Korean Notice of Preliminary Rejection, dated Mar. 27, 2012, with English Translation (9 pages).
EP 10 17 1317—European Office Action, dated Feb. 12, 2013 (5 pages).
CN 201010245531.9—First Chinese Office Action with Search Report, dated Apr. 28, 2013, with English Translation (37 pages).
CN 201010245531.9—Second Chinese Office Action, dated Nov. 27, 2013, with English Translation (6 pages).
Japanese Office Action and Translation, dated Jun. 12, 2017, for Japanese Application No. 2016-088119, 12 pages.

* cited by examiner

METHOD AND APPARATUS FOR IMPLEMENTING A POWER CONVERTER INPUT TERMINAL VOLTAGE DISCHARGE CIRCUIT

REFERENCE TO PRIOR APPLICATION(S)

This is a continuation of U.S. application Ser. No. 14/717,620, filed May 20, 2015, now pending, which is a continuation of U.S. application Ser. No. 14/100,882, filed Dec. 9, 2013, now U.S. Pat. No. 9,065,340, which is a continuation of U.S. application Ser. No. 13/345,257, filed Jan. 6, 2012, now U.S. Pat. No. 8,624,562, which is a continuation of U.S. application Ser. No. 12/533,977, filed Jul. 31, 2009, now U.S. Pat. No. 8,115,457. U.S. application Ser. No. 14/717,620 and U.S. Pat. Nos. 8,115,457, 8,624,562, and 9,065,340 are hereby incorporated by reference.

BACKGROUND INFORMATION

Field of the Disclosure

The present invention relates generally to circuits that discharge capacitance present between input terminals of a power system when an electrical energy source is disconnected from the power system input terminals. More specifically, the present invention relates to circuits that discharge EMI filter capacitors coupled across the input of power systems when a source of ac voltage is disconnected from the power system input terminals.

Background

Power systems may be used for a multitude of purposes and applications. Example power systems include power converters where input and output power is electrical such as power supplies. Other example power systems include power converters where input power is electrical and output power is primarily mechanical such as motor control systems. Power converters are typically coupled to a source of electrical energy that applies a voltage across the input terminals of the power converter. This source of electrical energy can be a dc or ac source. One class of power converters are switched mode power converters.

Switched mode power converters generate electromagnetic interference (EMI) during their operation. Switched mode power converters therefore include EMI filters that are designed to reduce, to acceptable levels, the amount of EMI that is coupled to the source of electrical energy. Many EMI filters include capacitors that are coupled across the input terminals of the power converter. In cases where the electrical energy source is an ac source, these capacitors may be safety rated capacitors such as X capacitors that are rated to allow direct connection across an ac electrical energy source prior to any input fuse of the power converter. The rugged nature of these X capacitors allows to them being used directly across the ac line regardless of the position of the input fuse of the power converter.

When the source of electrical energy is disconnected, the X capacitor can stay charged at a high voltage. If the X capacitor is of a large enough value, the energy stored on this capacitor can pose a safety risk to anyone that touches the input terminals of the power converter after the source of electrical energy has been disconnected. International safety standards typically stipulate therefore that if the total EMI filter capacitance is above a threshold value (typically 0.1 uF), then the voltage across the input terminals of the power supply must be reduced to a safe value within a specific period of time. Typically this requirement is achieved by permanently connecting one or more resistors across the X capacitor terminals. International safety standards, such as for example EN60950-1, stipulate that the time constant of the X capacitor capacitance and the total resistance coupled across the X capacitor is less than or equal to 1 second.

Existing resistive discharge circuits of the type described above are low cost and rugged but dissipate power continually in the resistance when the source of electrical energy is connected to the input terminals of the power system.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
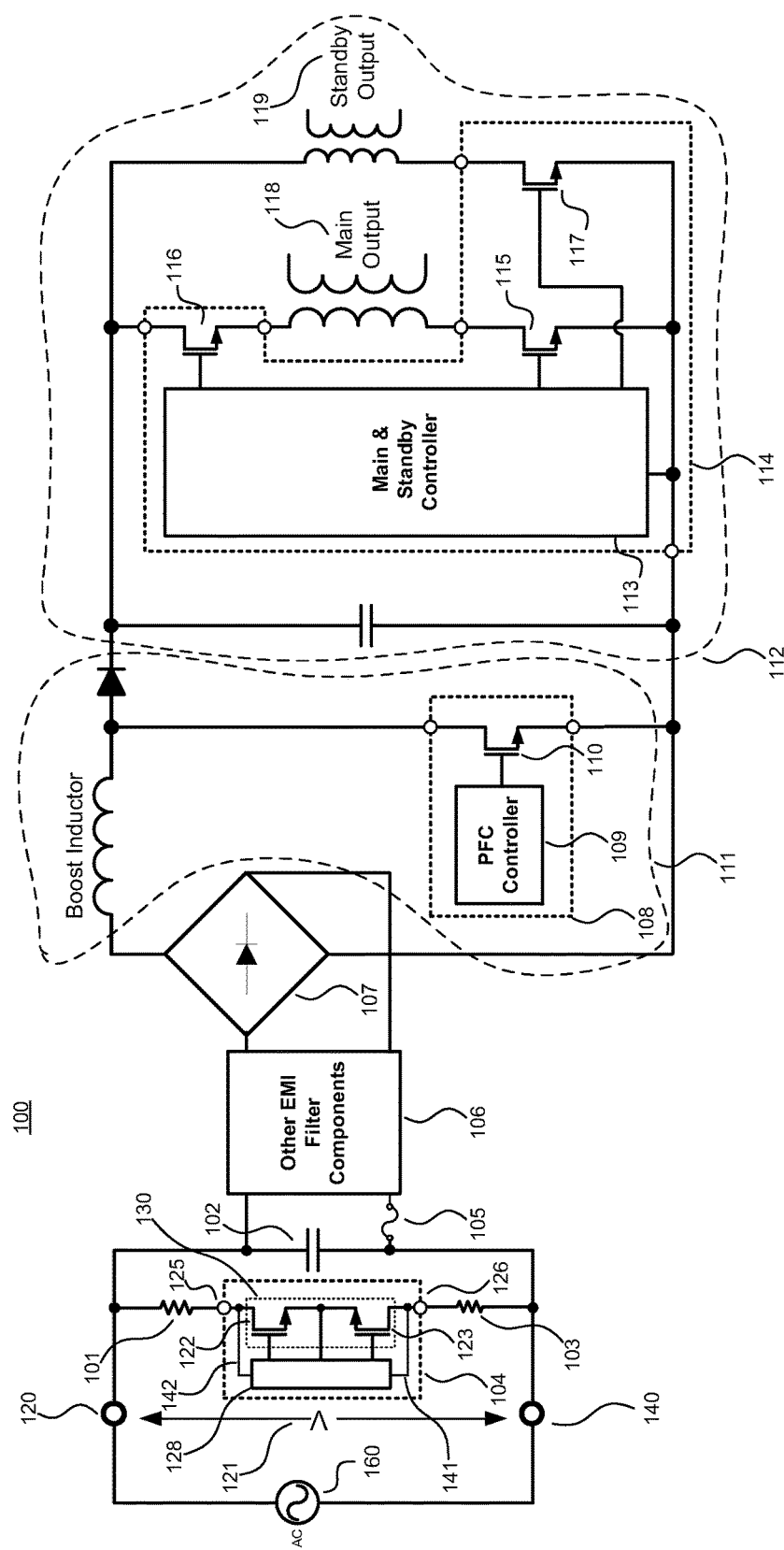
FIG. 1 is a schematic illustrating generally an example power converter employing a discharge circuit to discharge a capacitance between power converter input terminals when a source of electrical energy is disconnected from the power converter input terminals in accordance with the teachings of the present invention.

Methods and apparatuses for implementing a discharge circuit for discharging a capacitance existing between input terminals of a power system when a source of electrical energy is uncoupled from the input terminals of the power system are described. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The typical technique used to discharge the EMI filter capacitors (often X class safety capacitors) that appear across the input terminals of many power systems such as switched mode power supplies or switching motor control systems, is to place resistors coupled across the input terminals of the power system. These resistors are coupled in a position to provide a discharge current path for any energy left stored in the EMI filter capacitors after an electrical energy or electrical power source is disconnected from the power converter input terminals. In one example the electrical energy source is a mains ac voltage source having an rms voltage level in the 85 to 264 Vac range.

However emerging energy efficiency standards have created a need for a solution that substantially eliminates the power dissipation in these discharge resistors while the electrical energy source is still connected to the power system input terminals. Examples in accordance with the teachings of the present invention provide such a solution virtually eliminating dissipation in the discharge resistors while allowing the EMI filter capacitors to be discharged as required when the source of electrical energy is disconnected from the input terminals of the power system.

Various embodiments in accordance with the teachings of the present invention are described primarily using switched mode power converters and motor control power systems as examples. However it is appreciated that in general all the teachings in accordance with the teachings of the present invention discussed below can be applied to any system coupled to a source of electrical energy where the capacitance coupled between input terminals of the circuit poses a risk of electrical shock if left charged when the source of electrical energy is uncoupled from the input to the system.

To illustrate, FIG. 1 shows generally a schematic of an example power converter 100 in accordance with the teachings of the present invention. A source of electrical energy 160 provides an input voltage 121 and is coupled to input terminals 120 and 140. As shown, power converter 100 includes a discharge circuit 104 that will be discussed in more detail below. Power converter 100 also includes two power conversion stages in the illustrated example. The first is power factor correction (PFC) stage 111 and the second is dc-dc conversion stage 112. In the example, dc-dc stage 112 includes a main output 118 and a standby output 119, which is typical of many power converters in, for example, personal computers, televisions and the like. In one example, integrated circuit package 114 is a multi-die integrated circuit package that includes controller 113 and switches 115, 116 and 117, which are coupled to the main output 118 and standby output as shown. In another example, it is appreciated that controller 113 and switches 115, 116 and 117 may be included in a single monolithic integrated circuit. Controller 113 drives switches 115 and 116 to regulate energy flow to main output 118 and controller 113 drives switch 117 to regulate energy flow to standby output 119. Similarly in the example, controller 109 and switch 110 are included in an integrated circuit package 108. Controller 109 drives switch 110 to regulate a flow of energy to the output of PFC conversion stage 111 that provides the input to dc-dc conversion stage 112.

In the example of FIG. 1, the discharge circuit 104 is coupled across capacitor 102, which in one example includes one or more X capacitors. In the example, the power converter input fuse 105 is coupled between the capacitor 102 and the other EMI filter components 106, which for example could include one or more common mode filter chokes, inductors, Y capacitors and even additional X capacitors. In the example, the discharge circuit 104 includes a control circuit 128 and a switch 130. In one example, control circuit 128 and switch 130 is included in an integrated circuit. In one example, switch 130 is an ac switch that includes two re-channel MOSFETs 122 and 123 as shown. It is appreciated that in other embodiments, other ac switches constructed of for example bipolar transistors, thyristors, Triodes for alternating current (triacs), Diodes for alternating currents (diacs) or p channel MOSFETs could be employed whilst still benefiting from the teachings of the present invention.

In the example, drain terminal 125 of a first MOSFET 122 is coupled through resistor 101 to a first input terminal 120 of the power converter 100. Drain terminal 126 of a second MOSFET 123 is coupled through resistor 103 to a second input terminal 140 of the power converter 100 with the source terminals of MOSFETs 122 and 123 coupled together. In one example, controller 128 senses that the electrical energy source 160 is connected to power converter 100 input terminals 120 and 140 through, for example, connections 141 and 142. In one example, control circuit 128 senses that the voltage between connections 141 and 142 reverses within a maximum time period to determine that the electrical energy source 160 is still connected to the input of power converter 100. In one example, the maximum time period is approximately 20 milliseconds.

In the illustrated example, the control circuit 128 drives the switch 130 to have a high average impedance when the electrical energy source 160 is coupled across the input terminals 120 and 140. If the voltage between connections 141 and 142 does not reverse within a maximum time period, it is assumed that the electrical energy source 160 is no longer connected to the input of power converter 100. Under this condition, in one example, the control circuit 128 is coupled to drive the switch 130 such that capacitance 102 is discharged to below a threshold voltage in less than a maximum period of time. In one example, the threshold voltage is a safety extra low voltage (SELV) level. In one example, when controller 130 detects that the electrical energy source 160 is disconnected from input terminals 120 and 140, the controller 128 drives switch 130 into an on state such that current flows through resistors 101 and 103, switch 130 and capacitor 102. In one example, the values of resistors 101 and 103 are selected such that when switch 130 is in an on state, the time constant of the capacitor 102 and combined resistance of switch 130 and resistors 101 and 103 is less than 1 second.

In the example of FIG. 1, high voltage resistors 101 and 103 provide surge protection for the discharge circuit 104 since each resistor has a value typically in the 100 kOhm to 800 kOhm range. In some embodiments, these resistors are safety certified to allow connection between the inputs terminals 120 and 140 prior to input fuse 105. In one example, resistors 101 and 103 may also provide some protection for the discharge circuit 104 in the event that the discharge circuit 104 fails. For instance, a failure in discharge circuit 104 in may result in a short circuit such that the impedance between terminals 125 and 126 is substantially zero. However, since the resistors 101 and 103 can be rated to sustain continuous high voltage conditions, this failure of discharge circuit 104 is safe for the power system 100. For this reason, if resistors 101 and 103 are safety certified, discharge circuit 104 itself is not required to be safety certified since it is inherently protected by the presence of resistors 101 and 103.

Figure 2:
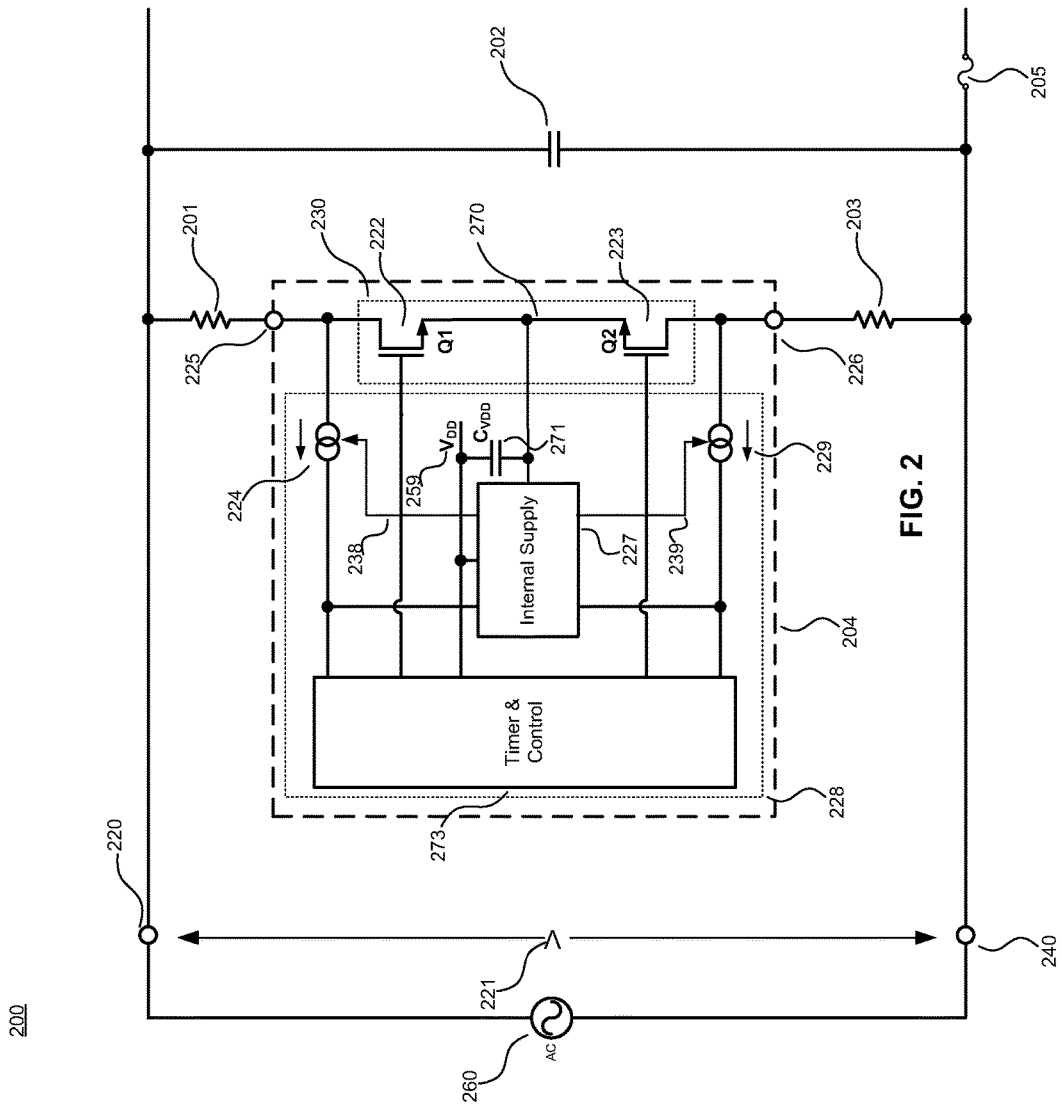
FIG. 2 shows one example of a block diagram of a discharge circuit to discharge a capacitance between a power converter input terminals when a source of electrical energy is disconnected from the power converter input terminals in accordance with the teachings of the present invention.

FIG. 2 shows a more detailed block diagram of an example discharge circuit 204 that in one example could be discharge circuit 104 in FIG. 1. For clarity of the description below, FIG. 2 includes certain external elements such as electrical energy source 260, input voltage 221, input terminals 220 and 240, resistors 201 and 203, and capacitance 202 which in one example could be similar to electrical energy source 160, input voltage 121, input terminals 120 and 140, resistors 101 and 103, and capacitance 102, respectively, of FIG. 1.

As shown in the depicted example, discharge circuit 204 includes control circuit 228 and switch 230. In the example, switch 230 is an ac switch that includes two n-channel MOSFETs 222 and 223 with their respective drains coupled to terminals 225 and 226 and sources coupled together at node 270 as the discharge circuit 204 internal ground or zero volt reference node. It is appreciated that in other examples the MOSFETs 222 and 223 could also be depletion mode MOSFETs configured with a different drive circuit in accordance with the teachings of the present invention. It is noted that in the example, the discharge circuit has only two terminals 225 and 226 coupled to external circuitry. In the example, operating power for the discharge circuit 204 is derived from high voltage current sources 224 and 229. It is appreciated that in one example, high voltage current sources 224 and 229 could be formed from part of the semiconductor structure of re-channel MOSFETs 222 and 223, (such as for example as illustrated in U.S. Pat. No. 5,285,369) respectively, and would then be regarded as being part of switch 230. However for explanation purposes, they are shown as separate current sources for the purpose of this description.

As shown in the illustrated example, current sources 224 and 229 are coupled to internal supply block 227, which generates internal supply voltage $V_{DD}$ that is decoupled internally with capacitor 271. It is appreciated that in other examples capacitor 271 could be an external capacitor. In an example where capacitor 271 is external to the discharge circuit 204, it is appreciated that discharge circuit 204 would then have at least 4 terminals including terminals 225 and 226, one additional terminal being the node 270 as the ground reference for the discharge circuit, and a terminal being the $V_{DD}$ supply rail 259. It is appreciated that, in general, the operating power for the discharge circuit to operate could also be derived in other ways, such as for example from high voltage current sources separately coupled to external nodes 220 and 240 for example, while still benefiting from the teachings of the present invention.

As shown the example depicted FIG. 2, current sources 224 and 229 are coupled to timer and control block 273. In one example, these connections between current sources 224 and 229 and timer and control block 273 can be used to detect whether electrical energy source 260 is coupled to input terminals 220 and 240. In the example, the ac voltage generated by electrical energy source 260 will periodically reverse in polarity. Depending on the polarity of the voltage across input terminals 220 and 260, one of current sources 224 and 229 will be unable to supply current.

For instance, in one example, at the time that the electrical energy source 260 reverses polarity, the voltage across terminals 225 and 226 will be so low such that neither current source 224 nor current source 229 will be able to supply current to the internal decoupling capacitor 271. In one example however, if the electrical energy source 260 is disconnected, then the polarity of voltage between terminals 220 and 260 will no longer reverse in polarity periodically and one of current source 224 or 229 will be able to supply current continuously as long as a voltage is present on the capacitor 202 is sufficiently large for the operation of the current sources 224 and 229. In one example timer and control circuit block 273 can sense that one of current sources 224 or 229 is able to continually supply current for an extended period that could in one example be at least 20 milliseconds. The timer and control circuit 273 could then determine that the electrical energy source has been disconnected and drive switch 230 into an on state in accordance with the teachings of the present invention.

In another example, discharge circuit 204 is configured such that the internal supply rail $V_{DD}$ 259 is coupled to be discharged to a level below an under voltage or reset level $V_1$ in response to the electrical energy source voltage reverses in polarity when the electrical energy source is coupled to the input terminals 220 and 240. Under these conditions, where $V_{DD}$ 259 is reduced to below an under voltage or reset level, in one example this event triggers a reset of the timer in circuit block 273. If the timer in circuit block 273 is not reset for an extended period, such as for example at least 20 milliseconds, in one embodiment this indicates that an ac source of electrical energy, for example 260, has been disconnected and in one example control circuit 273 could then drive switch 230 into an on state.

It is appreciated that in other examples, switch 230 could be configured as a current source circuit, such as for example by limiting the current in MOSFETs 223 and 222 to a specific value either by controlling the gate drive to MOSFETs 223 and 222, or by sizing the MOSFETs 223 and 222 to inherently limit the current flowing to a maximum value. It is appreciated that if switch 230 behaves as a current source, resistors 201 and 203 for example would not be necessary and the discharge circuit 204 itself would regulate the value of the discharge current flowing in switch 230. In such an example, it could be necessary to have the discharge circuit qualified as a safety rated circuit.

Figure 3:
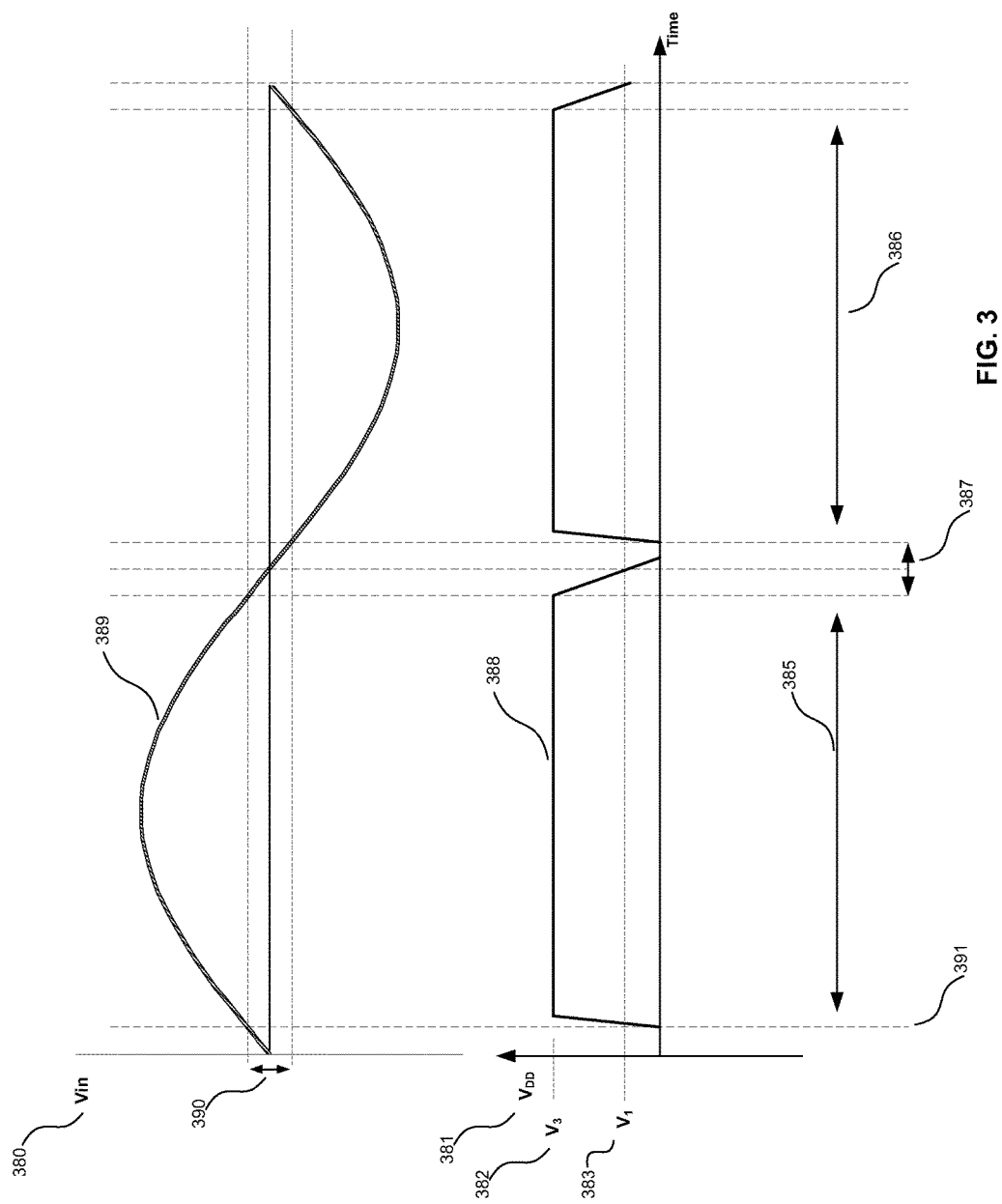
FIG. 3 shows waveforms associated with an example discharge circuit to discharge a capacitance between a power converter input terminals when a source of electrical energy is disconnected from the power converter input terminals in accordance with the teachings of the present invention.
Figure 4:
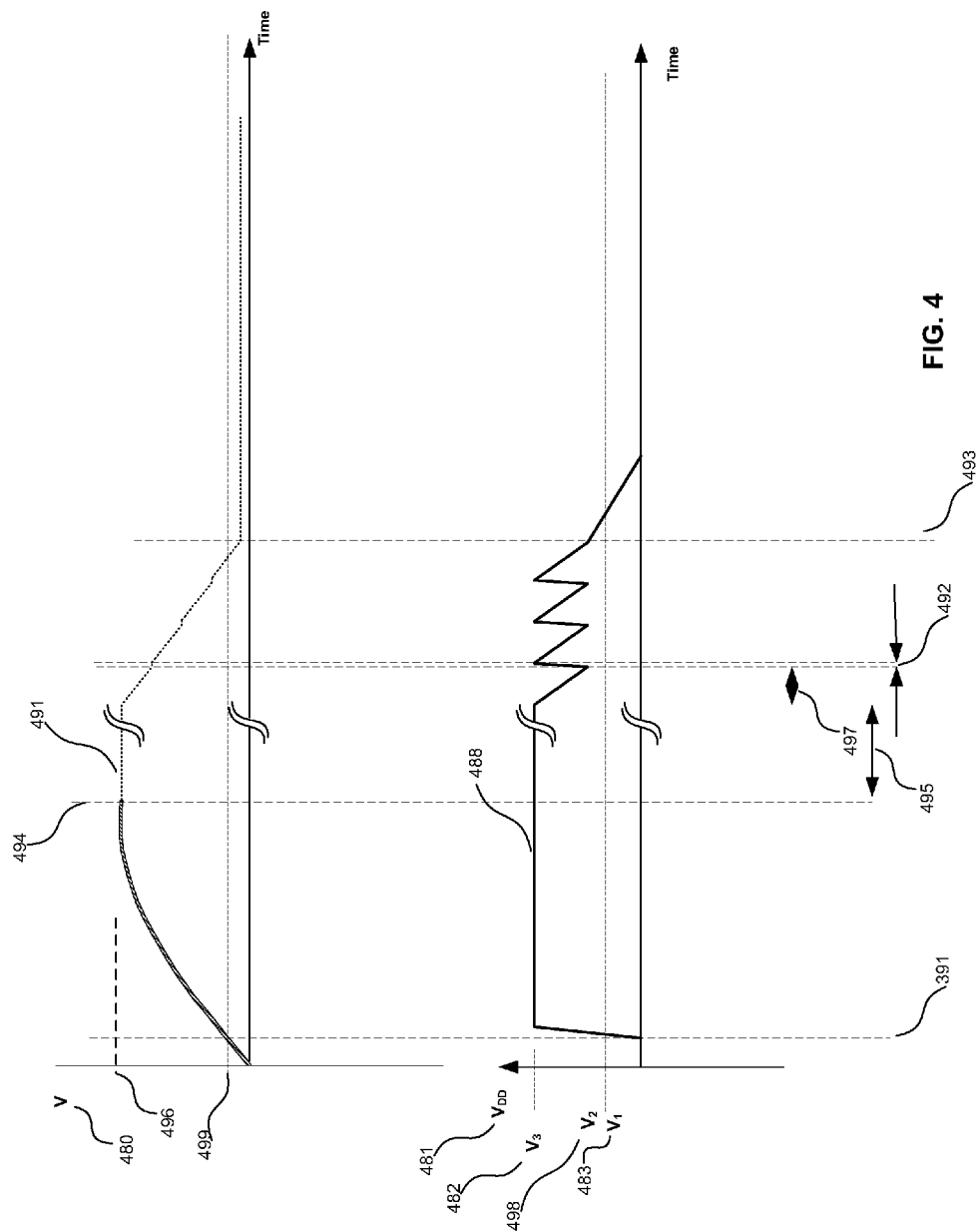
FIG. 4 shows further waveforms associated with an example discharge circuit to discharge a capacitance between a power converter input terminals when a source of electrical energy is disconnected from the power converter input terminals in accordance with the teachings of the present invention.

The waveforms of FIG. 3 illustrate generally operation of an example discharge circuit with reference to FIGS. 1 and 2. In particular, FIG. 3 shows two example waveforms 388 and 389. In one example, waveform 389 is an example voltage waveform generated by electrical energy source 160 or 260 in FIGS. 1 and 2. In the description of FIGS. 3 and 4 below, reference is made with respect to both FIGS. 1 and 2, but it is understood that in one example, discharge circuits 104 and 204 could be equivalent and therefore used interchangeably. In FIG. 3, example waveform 388 is the voltage across $C_{VDD}$ 271 in FIG. 2. In region 390, the voltage between terminals 225 and 226 is too low for either current source 224 or 229 to be able to supply the operating current requirement of discharge circuit 204.

For this description, it is assumed that a positive value of voltage waveform 389 corresponds to the voltage of terminal 225 being higher than terminal 226. Therefore when the magnitude of the voltage value of waveform 389 is high enough, in region 385, current source 224 is capable of supplying enough current to allow capacitor $C_{VDD}$ to be charged up to level 382 $V_3$ at time 391 for example. In one example internal supply block 227 then regulates a voltage across capacitor $C_{VDD}$ 271 to be substantially equal to $V_3$ 382 as shown by the substantially flat portion of waveform 388 in region 385. In one example, this regulation is achieved by controlling current sources 224 and 229, as represented with signal lines 238 and 239, either by linearly controlling the current flow or with an on/off or hysteretic mode of control. It is recognized that in another example, waveform 388 in region 385 would not look flat but could be a sawtooth shape if a hysteretic mode of control of current sources 224 and 229 is used. In one example $V_3$ 382 is substantially equal to 5.8 Volts.

In one example, when voltage waveform 389 is negative, current source 229 is active in region 386. Internal supply block 227 therefore regulates the current flowing through current sources 224 and 229 to only that required to operate the discharge circuit 204. In one example the total current required to operate the discharge circuit 204 is less than 30 µA. This ensures that the impedance between terminals 225 and 226 is high on average during the time that an electrical energy source, such as for example electrical energy source 260, generating waveform 389 is connected to the power converter in which the discharge circuit 204 is used.

When the magnitude of voltage waveform 389 becomes too low for either current source 224 or 229 to charge $C_{VDD}$ 271, such as for example in region 387, in one example $V_{DD}$ 381 falls below a lower under voltage or reset threshold voltage $V_1$ 383, which in one example is the threshold used to reset a timer in timer and control circuit 273. In one example $V_1$ 383 is approximately 3 Volts.

FIG. 4 shows example waveforms 491 and 488, which in one example could occur when, in FIGS. 1 and 2, electrical energy sources 160 and 260, respectively, are disconnected from input terminals 120, 140 and 220, 240 at time 494. For clarity of the explanation below, reference is made to the discharge circuit 204 in FIG. 2. It is assumed that at times after 494, zero current is flowing in fuse 205 and the only path for current to flow to discharge capacitor 202 is therefore through resistors 201 and 203 and discharge circuit 204. In the example, the operation prior to time 494 is very similar to that shown in and described with reference to FIG. 3 above.

Continuing with the example illustrated in FIG. 4, at time 494, the electrical energy source 260 is disconnected. The voltage across capacitor 202, however, remains at a final value 496 of the electrical energy source 260 just prior to time 494 as illustrated by waveform 491. After an extended period of time 495, which in one example is approximately 20 milliseconds, the timer in timer and control block 273 has not been reset. In one example, transistors 222 and 223 are then driven into an on state allowing current to flow in resistors 201 and 203, transistors 222 and 223, and capacitor 202. The voltage across capacitor 202 therefore drops at a rate determined by the total resistance of resistors 201 and 203, switch 230 and the capacitance of capacitor 202. For explanation purposes, this is illustrated in FIG. 4 with an approximately linear reduction of waveform 491 during period 497. It is understood, however, that the reduction would actually follow an RC discharge characteristic determined by the total resistance and capacitance of the discharge path.

As shown in the depicted example, the internal supply voltage 488 of discharge circuit 204 also decays as shown by waveform 488 during period 497, to a lower voltage threshold $V_2$ 498. In one example $V_2$ 498 is substantially equal to 4.8 Volts. In the example, the internal supply voltage 488 is then recharged during period 492 back to threshold voltage level $V_3$ 482. In one example this is accomplished by turning off transistors 222 and 223 in FIG. 2, which allows one of the internal current sources 224 or 229 to recharge internal supply decoupling capacitor 271. In one example $V_3$ 482 is substantially equal to 5.8 Volts. When the internal supply voltage 488 is charged to voltage threshold $V_3$, the transistors 222 and 223 are turned on to continue discharging the capacitor 202.

In one example, this process of discharging and recharging discharge circuit supply voltage 488 continues until the voltage remaining on external capacitor 202, which is represented by waveform 491, falls below a threshold value 499. At this point, the internal current sources 224 and 229 can no longer recharge the internal capacitor 271, even when MOSFETs 222 and 223 are turned off again at time 493. In this condition, when the internal supply voltage represented by waveform 488 reaches $V_2$ 498 at time 493, the voltage 488 continues to reduce at a rate determined by the quiescent current consumption of the circuitry internal to discharge circuit 204. Beyond time point 493, the external capacitor 202 is substantially discharged and is therefore not discharged any further since transistors 222 and 223 are turned off. In one example, threshold voltage level 499 is in the range of 5 to 10 volts.

Therefore, with reference to the circuit of FIG. 2, in one example, the control circuit 228 could alternately be described as driving switch 230 with at least two operating modes. A first operating mode when electrical energy source 260 is coupled to the input terminals 220 and 240. During this first mode, the control circuit 228 drives switch 230 such that a high average impedance is present between terminals 225 and 226. In one example, the impedance between terminals 225 and 226 is such that a current flow between terminals 225 and 226 is less than 30 μA corresponding to an average impedance of typically greater than 3 MOhms when averaged for example over a time period of at least 100 μseconds.

In a second operating mode, the control circuit 228 detects the electrical energy source 260 has been uncoupled from the input terminals 220 and 240. At this point, switch 230 is driven such that a capacitance 202 existing between the input terminals 220 and 240 is discharged to below a threshold voltage in less than a maximum period of time from when the electrical power or energy source 260 is uncoupled from the input terminals 220 and 240 in accordance with the teachings of the present invention.

Figure 5:
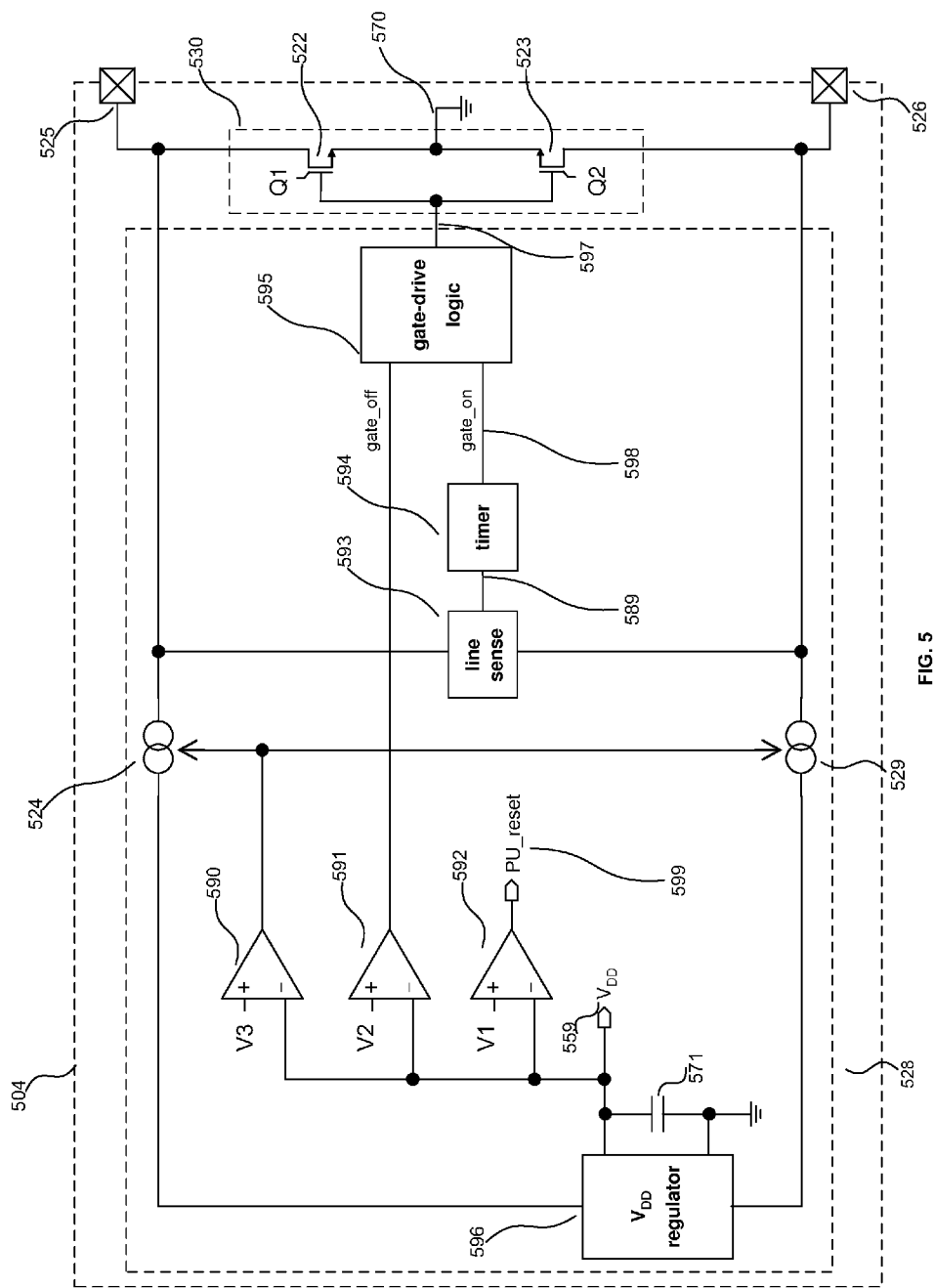
FIG. 5 is a schematic illustrating an example of a discharge circuit to discharge a capacitance between a power converter input terminals when a source of electrical energy is disconnected from the power converter input terminals in accordance with the teachings of the present invention.

FIG. 5 is a schematic illustrating an example of a discharge circuit 504 to discharge a capacitance between a power converter input terminals when a source of electrical energy is disconnected from the power converter input terminals in accordance with the teachings of the present invention. In one example, discharge circuit 504 is an integrated circuit. In one example, the example discharge circuit 504 illustrated in FIG. 5 could be the discharge circuits described above with reference to FIGS. 1 and 2 generating waveforms similar to those shown in FIGS. 3 and 4 in accordance with the teachings of the present invention.

As shown in the example depicted in FIG. 5, discharge circuit 504 has only two external terminals 525 and 526 coupled to switch 530. In the example, switch 530 is an ac switch that includes two MOSFETs 522 and 523. It is appreciated that in other examples, switch 530 could include other types of switches such as JFET switches or the like while still benefiting from the teachings of the present invention. In one example, regulator circuit 596 generates a supply rail 559 having voltage $V_{DD}$ decoupled with capacitor 571. Control circuit 528 is powered from supply rail 559 and provides a gate drive output 597 to drive switch 530. Comparators 590, 591 and 592 monitor supply rail voltage 559. If supply rail 559 is below V3, comparator 590 output drives current sources 524 and 529 to supply current to regulator block 596. If supply rail 559 is above V3, comparator 590 output drives current sources 524 and 529 off. If supply rail 559 is below V2, comparator 591 output provides a high signal to gate drive logic block 595 to turn off switch 530. If supply rail 559 is above V2, comparator 591 output provides a low signal to gate drive logic block 595.

In one example, line sense block 593 is coupled to timer block 594 to reset timer 594 every time the voltage between terminals 525 and 526 falls below a threshold voltage level. In one example, if the voltage between terminals 525 and 526 does not fall below a threshold voltage level for a threshold period of time, timer output signal 598 is coupled to gate drive logic block 595 to drive switch 530 into an on state. If supply rail voltage 559 falls below voltage threshold V1, PU_reset signal 599 is coupled to reset timer 594 and all other circuitry within control circuit 528.

In another example, line sense block 593 could be eliminated altogether and PU_reset signal 599 could instead be coupled to input 589 of timer circuit 594. In that example, the power up reset event itself is used to reset timer circuit 594 such that if supply rail 559 does not fall below threshold voltage level V1 for more than a threshold period of time, timer output signal 598 is coupled to gate drive logic block 595 to command that switch 530 is turned on.

Figure 6:
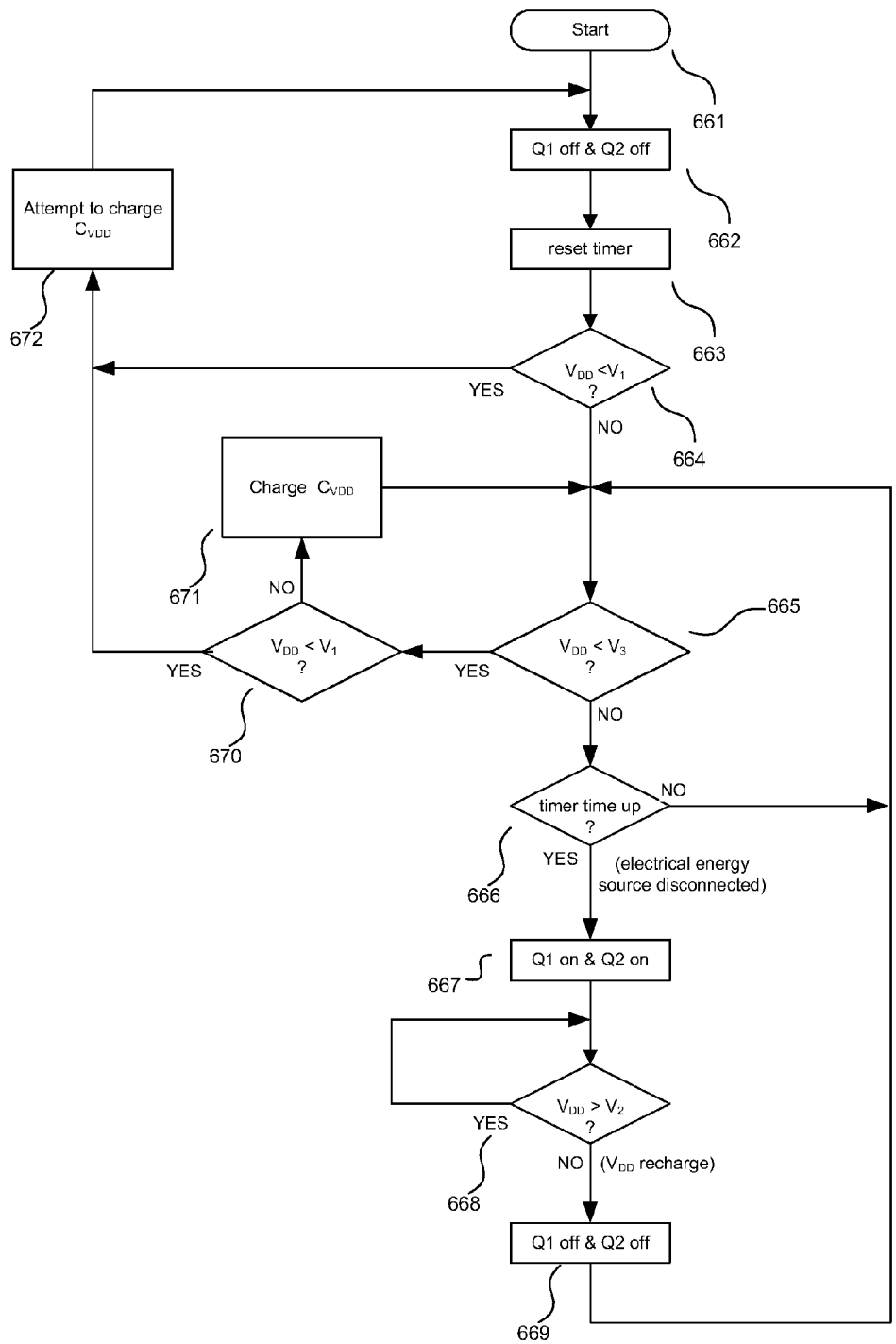
FIG. 6 is a flowchart illustrating an example method for discharging a capacitance between a power converter input terminals when a source of electrical energy is disconnected from the power converter input terminals in accordance with the teachings of the present invention.

FIG. 6 shows generally a flowchart 660 illustrating an example method for discharging a capacitance between power system input terminals when a source of electrical energy is disconnected from the power system input terminals. In one example FIG. 6 could describe the operation of circuits 104 and 204 in FIGS. 1 and 2 above. The use of terms $V_1$, $V_2$ and $V_3$ can in one example be assumed equivalent to voltage levels 383/483, 498 and 382/482 in FIGS. 3 and 4. Operation starts in block 661 and in block 662 Q1 and Q2 are in an off state. In one example, Q1 is equivalent to MOSFET 222 and Q2 is equivalent to MOSFET 223 in FIG. 2. In block 663, the timer is reset, which in one example could be the timer described above with reference to timer and control block 273. In block 664, if $V_{DD}$ is less than $V_1$, then the circuit attempts to recharge $C_{VDD}$, for example $C_{VDD}$ 271 in FIG. 2, and returns to block 662. If, however, $V_{DD}$ is greater than $V_1$, then the circuit checks if $V_{DD}$ is less than $V_3$ in block 665. If not, in the example, block 666 checks if the internal timer time is up and if so, it is determined that for example electrical energy source 260 has been disconnected and both Q1 and Q2 are turned on in block 667. In block 668, it is continually checked whether $V_{DD}$ is greater than $V_2$ and if so, the condition of Q1 and Q2 being in an on state persists. However, as soon as $V_{DD}$ is no longer greater than $V_2$, Q1 and Q2 are turned off in block 669. The operation then returns to block 665, where again it is determined whether $V_{DD}$ is less than $V_3$. If it is, then block 670 checks if $V_{DD}$ is less than the lower under voltage or reset voltage threshold of $V_1$, in which case then the circuit attempts to recharge $C_{VDD}$ in block 672 and returns to block 662. Otherwise, $C_{VDD}$ is recharged in block 671 and operation returns to block 665.

Figure 7:
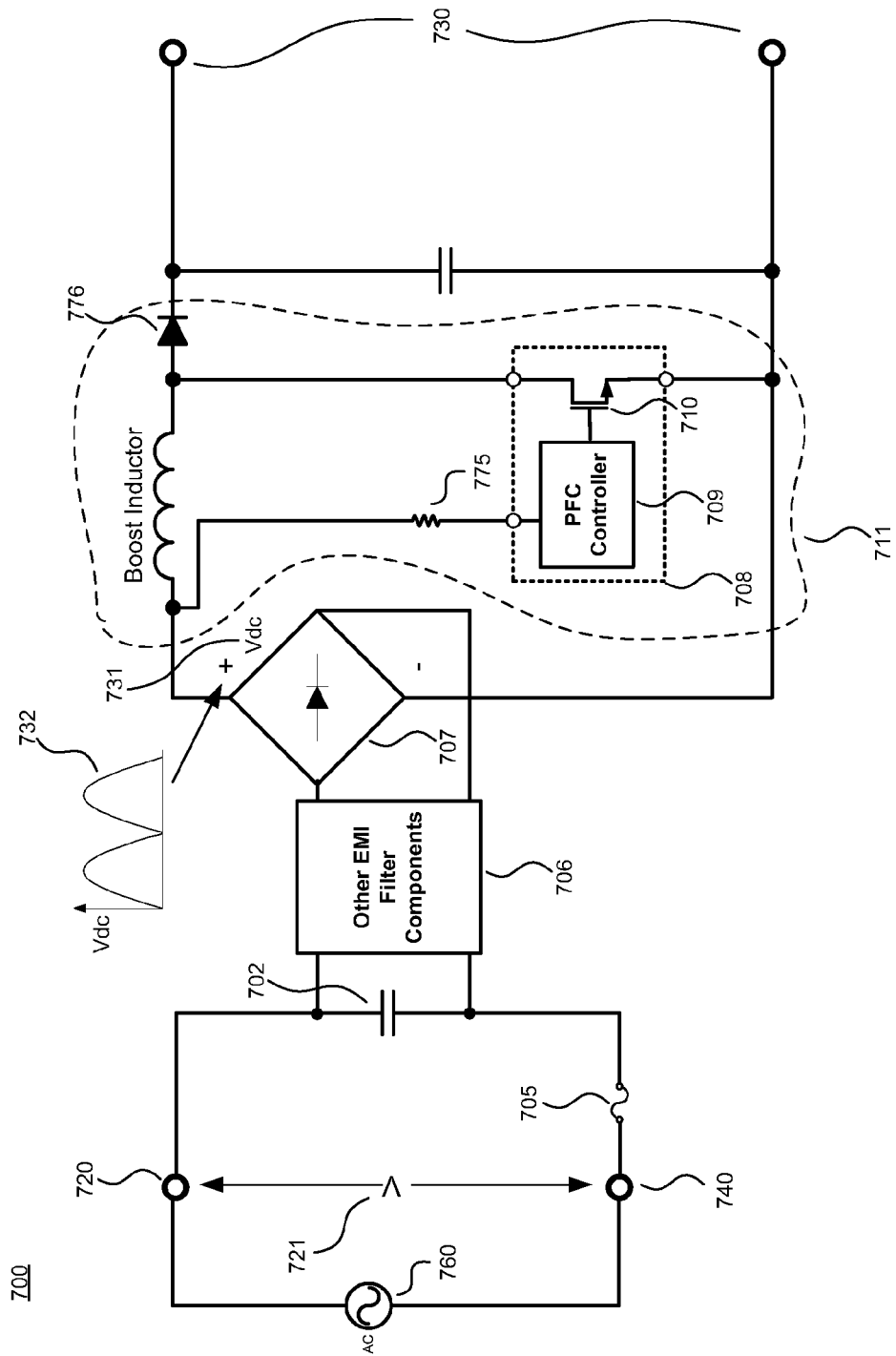
FIG. 7 is an example circuit schematic of a power converter circuit employing a control circuit coupled to drive a switch in a first operating mode when a source of electrical energy is coupled to the power converter input terminals and a second operating mode when the source of electrical energy is uncoupled from the power converter input terminals in accordance with the teachings of the present invention.

FIG. 7 is an example circuit schematic of a power converter 700 circuit employing a control circuit 709 and switch 710 coupled to transfer energy from an input to an output 730 of the power converter during a first operating condition and coupled such that the switch 710 conducts a current without transferring energy from an input to an output of the power converter under a second operating condition.

In the example, converter 700 is a boost converter. In one example, the boost converter 700 could be used to perform a power factor correction function as will be known to one skilled in the art. Power converter 700 is coupled to a source of electrical energy or electrical power 760 and includes a fuse 705 coupled between EMI capacitor 702 and input terminal 740 of power converter 700. In the example, other EMI filter component block 706 is coupled to bridge rectifier circuit 707. The output of bridge rectifier circuit 707 couples to boost converter circuit 711 such that, during normal operation, control circuit 709 drives switch 710 to regulate the flow of energy from power converter 700 input terminals 720 and 740 to output 730 when the electrical energy source 760 is coupled to the input of the power converter 700.

In one example, control circuit 709 is coupled to detect when the electrical energy source 760 is disconnected from the input of the power converter 700 by sensing, for example, a current in resistor 775. As shown in the depicted example, resistor 775 is coupled between an output of rectifier circuit 707 and controller 709. While electrical energy source 760 is coupled to the input of the power converter 700, voltage Vdc 731 appearing across the output of rectifier circuit 707 is a full wave rectified but unsmoothed version of the ac input voltage 721 as represented by waveform 732 shown in FIG. 7. When electrical energy source 760 is uncoupled from the input of the power converter 700, however, Vdc 731 will become a steady dc value determined by the value of the electrical energy source 760 voltage at the moment of disconnection. In one example the controller 709 is coupled to detect a current flowing in resistor 775 as a way to detect whether Vdc is a full wave rectified voltage such as represented by waveform 732, or steady dc voltage level and therefore whether electrical energy source 760 is coupled or uncoupled to the input of the power converter 700. In one example, this could be accomplished by using timing techniques similar to the one used in discharge circuit 204. It is appreciated that detection of this type could also be accomplished by coupling controller 709 to a node before rectification circuit 707 while still benefiting from the teachings of the present invention.

In an alternative description of power converter 700, control circuit 709 can be described as driving switch 710 with at least two operating modes. A first operating mode when electrical energy source 760 is coupled to the input of the power converter 700. During this first mode, the control circuit 709 drives switch 710 to regulate a flow of energy from the input to the output of power converter 700. The first mode includes a condition where the energy flow is regulated to substantially zero during a standby or shutdown mode of the control circuit 709. In the standby or shutdown condition, the control circuit 709 drives switch 710 into an off state.

In a second operating mode, the control circuit 709 detects that the electrical energy source 760 has been uncoupled from the input to the power converter 700. Switch 710 is then driven such that current flows in the switch 710. A capacitance 702 existing between the input terminals 720 and 740 of the power converter 700 is then discharged to below a threshold voltage in less than a maximum period of time from when the electrical power or energy source 760 is uncoupled from the input terminals 720 and 740 of the power converter 700 in accordance with the teachings of the present invention. The maximum period of time is unaffected by the amount of energy flow between power converter 700 input and output immediately prior to the electrical energy source being uncoupled from the input terminals of the power converter.

It is noted that discharging the capacitance 702 could in one example be accomplished by driving switch 710 on continuously until the required level of discharge of capacitance 702 is achieved. In another example, discharging the capacitance 702 could be accomplished by driving the switch 710 on and off until the required discharge of capacitance 702 is achieved such that energy is still transferred from an input to an output of the power converter 700 during the discharging period in accordance with teachings of the present invention. In one example, the flow of energy from input to output of the power converter 700 during this discharge period may be regulated or unregulated by control circuit 709.

Figure 8:
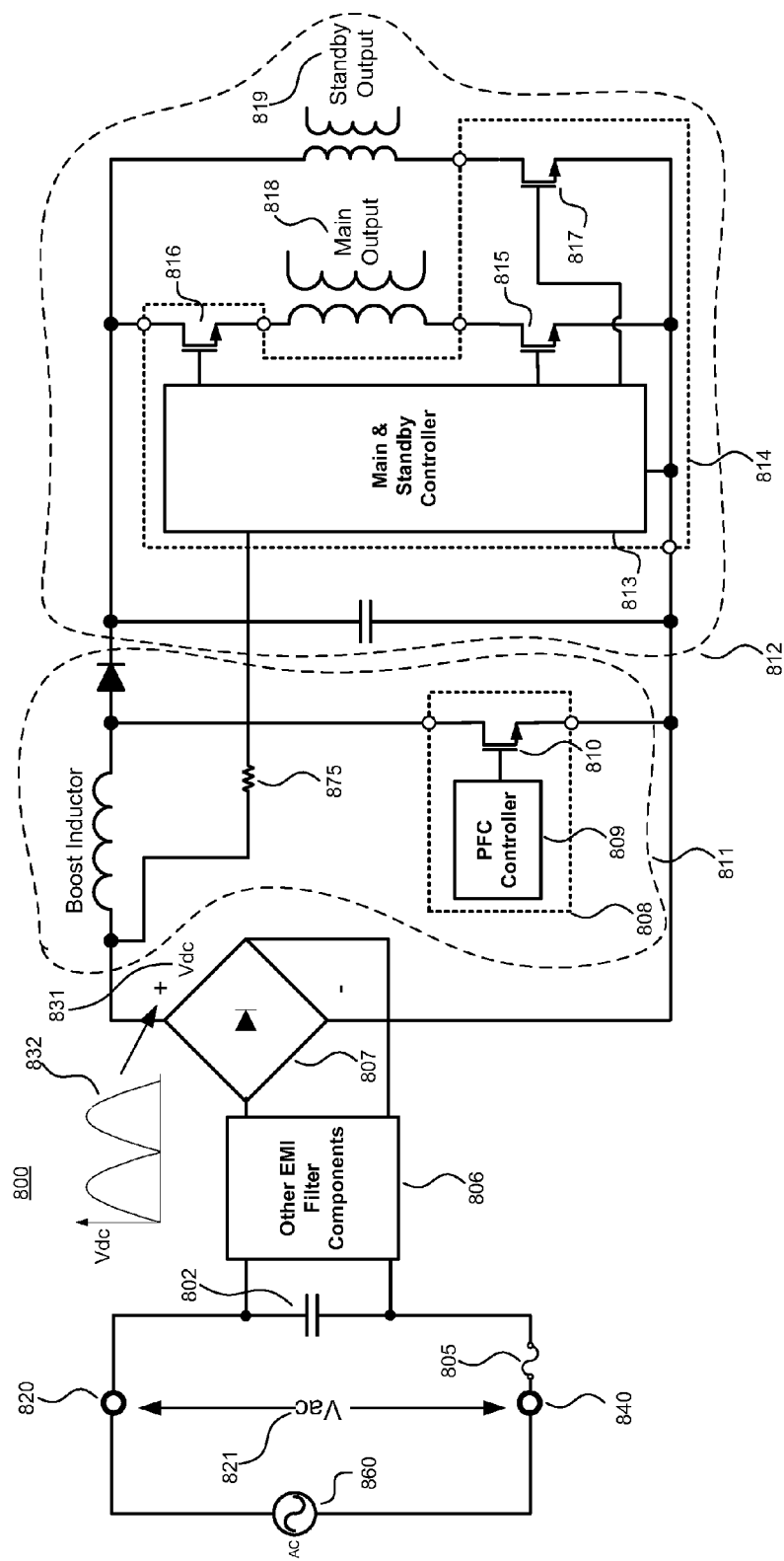
FIG. 8 is another example circuit schematic of a power converter circuit employing a control circuit coupled to drive a switch in a first operating mode when a source of electrical energy is coupled to the power converter input terminals and a second operating mode when the source of electrical energy is uncoupled from the power converter input terminals in accordance with the teachings of the present invention.

FIG. 8 is another example circuit schematic of a power converter 800 circuit employing a control circuit 813 in accordance with the teachings of the present invention. As shown in the depicted example, control circuit 813 is coupled to switches 815, 816 and 817. In the example, switches 816 and 815 are the two switches of a 2 switch forward converter forming the main power supply, which may be utilized, for example, in a personal computer power converter. In the example, switch 817 is the switch of a flyback converter, which for example could form part of a standby power supply in a personal computer power converter. Both main and standby power conversion stages can be referred to as dc-dc converters since the output voltage of power conversion stage 811 is a substantially constant dc value. In one example, switch 817 is driven by control circuit 813 to transfer energy from an input of power converter 800 to an output 819 of the power converter during a first operating condition and coupled such that switch 817 conducts a current without transferring energy from the input of converter 800 to the output 819 under a second operating condition.

As shown in the depicted example, power converter 800 is coupled to a source of electrical energy or electrical power 860 and includes a fuse 805 coupled between EMI capacitor 802 and input terminal 840 of power converter 800. In the example, other EMI filter components block 806 is coupled to bridge rectifier circuit 807. As shown in the example, the output of bridge rectifier circuit 807 is coupled to boost converter circuit 811. The output of boost converter circuit 811 is coupled to forward and flyback converters 812.

During one mode of operation, control circuit 813 drives switches 815 and 816 to regulate the flow of energy from power converter 800 input terminals 820 and 840 to output 818 when the electrical energy source 860 is coupled to the input of the power converter 800. In one example control circuit 813 is coupled to detect when the electrical energy source 860 is disconnected from the input of the power converter 800 by sensing a current, for example, in resistor 875. As shown in the depicted example, resistor 875 is coupled between an output of rectifier circuit 807 and controller 813. While electrical energy source 860 is coupled to the input of the power converter 800, voltage Vdc 831 appearing across the output of rectifier circuit 807 is a full wave rectified but unsmoothed version of the ac input voltage 821 as represented by waveform 832. When electrical energy source 860 is uncoupled from the input of the power converter 800 however, Vdc 831 will become a steady dc value determined by the value of the electrical energy source 860 voltage at the moment of disconnection. In one example, the controller 813 is coupled to detect a current flowing in resistor 875 as a way to detect whether Vdc 831 is a full wave rectified or steady dc voltage level and therefore whether electrical energy source 860 is coupled or uncoupled to the input of the power converter 800. In one example, this could be accomplished by using timing techniques similar to the one used in discharge circuit 204. It is appreciated that detection of this type could also be accomplished by coupling controller 813 to a node before rectification circuit 807 while still benefiting from the teachings of the present invention.

In an alternative description of power converter 800, control circuit 813 can be described as driving switches 815 and 816 with at least two operating modes. A first mode when electrical energy source 860 is coupled to the input of the power converter 800. During this first mode, the control circuit 813 drives switches 815 and 816 to regulate a flow of energy from the input to the output 818 of power converter 800. The first mode includes a condition where the energy flow is regulated to substantially zero during a standby or shutdown mode of the control circuit 813. In the standby or shutdown condition, the control circuit 813 may drive switches 815 and 816 into an off state.

In a second operating mode, the control circuit 813 detects that the electrical energy source 860 has been uncoupled from the input to the power converter 800. Switches 815 and 816 are then driven such that a capacitance 802 existing between the input terminals of the power converter is discharged to below a threshold voltage in less than a maximum period of time from when the electrical power or energy source 860 is uncoupled from the input terminals 820 and 840 of the power converter 800 in accordance with the teachings of the present invention. The maximum period of time is unaffected by the amount of energy flow between power converter 800 input and output immediately prior to the electrical energy source 860 being uncoupled from the input terminals of the power converter 800.

It is noted that discharging the capacitance 802 could in one example be accomplished by driving the switches 815 and 816 on and off until the required discharge of capacitance 802 is achieved such that energy is still transferred from an input to an output of the power converter during the discharging period in accordance with the teachings of the present invention. In one example, the flow of energy from input to output of the power converter during this discharge period may be regulated or unregulated by control circuit 813.

In an alternative example using power converter 800, control circuit 813 can also be described as driving switch 817 with at least two operating modes. A first mode when electrical energy source 860 is coupled to the input of the power converter 800. During this first mode, the control circuit 813 drives switch 817 to regulate a flow of energy from the input to the output 819 of power converter 800. The first mode includes a condition where the energy flow is regulated to substantially zero during a standby or shutdown mode of the control circuit 813. In the standby or shutdown mode, the control circuit 813 drives switch 817 in an off state.

In a second operating mode, the control circuit 813 detects that the electrical energy source 860 has been uncoupled from the input to the power converter 800. Switch 817 is then driven such that the capacitance 802 existing across the input terminals of the power converter 800 is discharged to below the threshold voltage in less than a maximum period of time from when the electrical power or energy source 860 is uncoupled from the input terminals 820 and 840 of the power converter 800 in accordance with the teachings of the present invention.

It is noted that discharging the capacitance 802 could in one example be accomplished by switching the switch 817 on continuously until the discharge of capacitance 802 is achieved. In another example, discharging the capacitance 802 could be accomplished by switching the switch 817 on and off until the required discharge of capacitance 802 is achieved such that energy is still transferred from an input to an output of the power converter during the discharging period in accordance with the teachings of the present invention. In one example, the flow of energy from input to output of the power converter during this discharge period may be regulated or unregulated by control circuit 813.

It is noted that the examples of FIGS. 7 and 8 discussed fuses 705 and 805 are positioned between the input terminals of power converters 700 and 800 and capacitors 702 and 802, respectively. In this arrangement, there is discharge path between capacitance 702 and switch 710 in FIG. 7, and between capacitance 802 and switches 816/815 or 817 in FIG. 8, even if the respective input fuses are in an open circuit condition. It is appreciated that with this arrangement of the input fuse 705 or 805, a further example of a circuit, not shown, benefiting from the teachings of the present invention could be a switch coupled directly across the output terminals of rectification circuits 707 or 807 in FIG. 7 or 8, respectively. Such a switch could perform a similar discharge function to that performed by switches 710, 815, 816 and 817 described above and could be driven from controllers 709 or 813. In one example this switch could be coupled to a current limiting resistor to limit maximum peak current in the switch during a discharge event.

It is appreciated that other examples of circuits benefiting from the teachings of the present invention could include, for example, using circuitry internal to control circuit 709 in FIG. 7 and coupled to resistor 775 as a current path for discharging a capacitance 702 that exists between the input terminals of power converter 700 when electrical energy source 760 is uncoupled from the input of power converter 700. In one example, this could be accomplished by using techniques similar to the discharge circuit 204 but with a single dc switch and a single current source in place of the ac switch formed by switches 222 and 223 and current sources 224 and 229. In one example, the current flowing in resistor 775 while electrical energy source 760 is coupled to the input of power converter 700 could also provide a starting current for the operation of the control circuit 709. In the example, the start up current is supplied only during a start up phase of control circuit 709 after which a supply winding, not shown, on the boost inductor or other magnetic components would take over providing supply current to control circuit 709.

Yet another example could include, for example, using circuitry internal to control circuit 813 in FIG. 8 and coupled to resistor 875 as a current path for discharging a capacitance 802 that exists between the input terminals of power converter 800 when electrical energy source 860 is uncoupled from the input of power converter 800. In one example, this could be accomplished by using techniques similar to the discharge circuit 204 but with a single dc switch and a single current source in place of the ac switch formed by switches 222 and 223 and current sources 224 and 229. In one example, the current flowing in resistor 875 while electrical energy source 860 is coupled to the input of power converter 800 could provide a starting current for the operation of the control circuit 813. In the example, the start up current function is active only during a start up phase of control circuit 813 after which a supply winding, not shown, within the power converter 800 on the boost inductor or other magnetic components for example, would take over providing supply current to control circuit 813 when the voltage on that winding reaches a threshold value.

It is also appreciated that power converters 700 and 800 could have other modes of operation other than the modes described above for explanation purposes, including, for example, specific protection modes when a fault occurs, while still benefitting from the teachings of the present invention.

Figure 9:
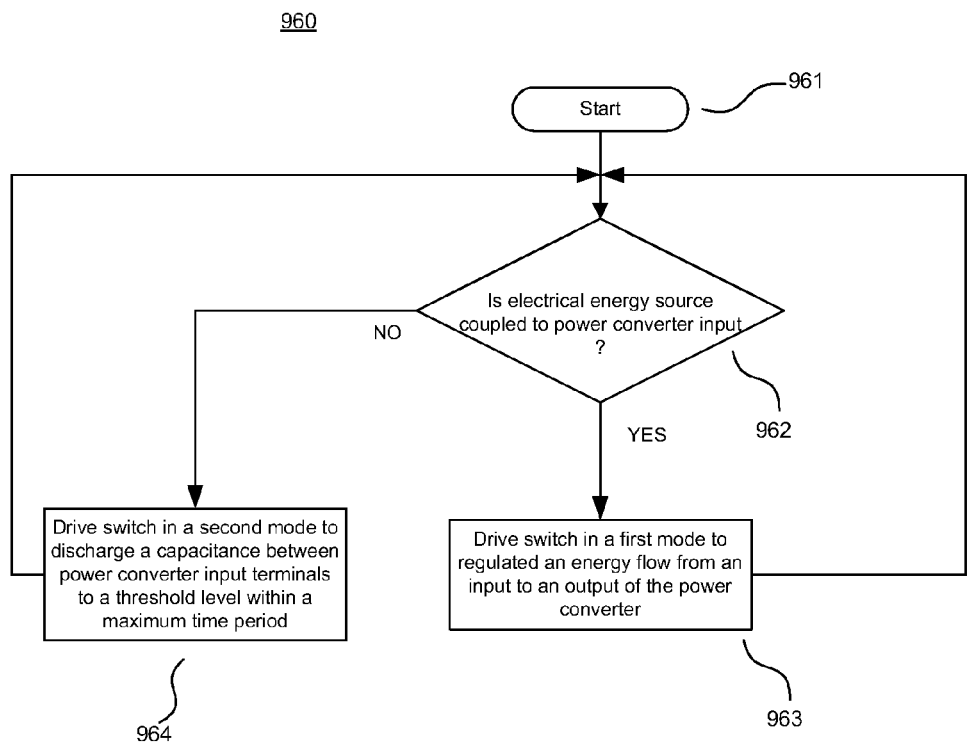
FIG. 9 is a flowchart illustrating an example method for controlling a controller and a switch used in a power converter such that energy is transferred from an input to an output of the power converter during a first operating condition and where the switch conducts current without transferring energy from an input to an output during a second operating condition in accordance with the teachings of the present invention.

FIG. 9 shows generally a flowchart 960 illustrating an example method for a control circuit to discharge a capacitance between input terminals of a power converter when a source of electrical energy is disconnected from the power converter input terminals. In one example, the method illustrated in FIG. 9 is similar to those described above with respect to FIGS. 7 and 8. As shown, the power converter starts in block 961. In block 962, it is determined whether a source of electrical energy is coupled to the power converter input. If it is, the control circuit drives a switch to regulate an energy flow from an input to an output of the power converter. It is appreciated that in one example, the energy flow could be regulated to substantially zero. The output of block 963 is then connected to the input of decision block 962. If the electrical energy source is not connected to the power converter input, then the output of block 962 is connected to block 964, in which the control circuit drives a switch to discharge a capacitance connected between power converter input terminals to a threshold level within a maximum period of time in accordance with the teachings of the present invention.

Figure 10:
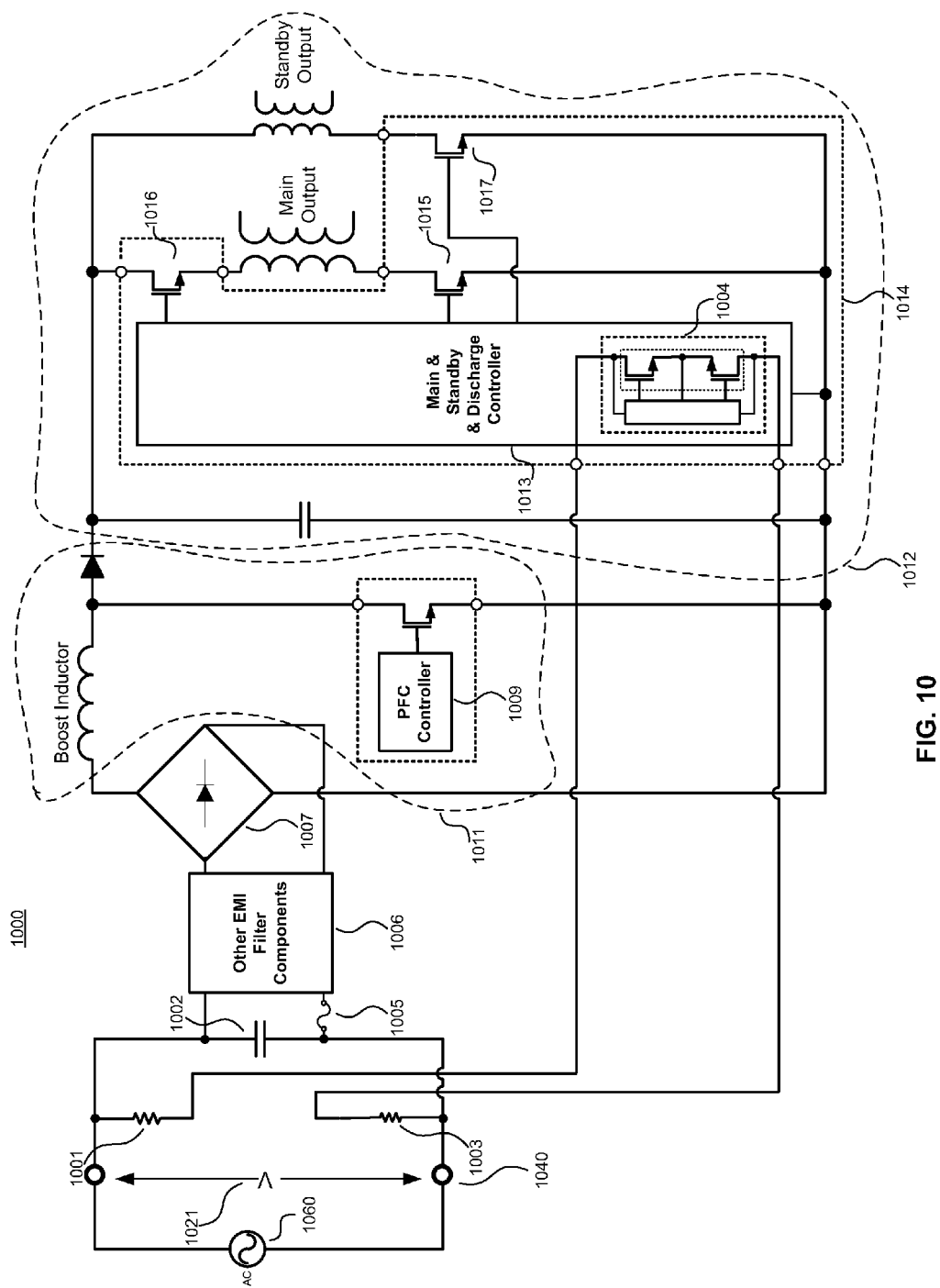
FIG. 10 is a schematic illustrating an example power converter employing discharge circuit, integrated with a power converter control circuit, to discharge a capacitance between a power converter input terminals when a source of electrical energy is disconnected from the power converter input terminals in accordance with the teachings of the present invention.

FIG. 10 shows another example circuit benefiting from the teachings of the present invention. It is appreciated that the example circuit diagram shown in FIG. 10 shares similarity with the example circuit diagram shown in FIG. 1. However, discharge circuit 1004 in FIG. 10 has been integrated within Main, Standby & Discharge control circuit 1013. As shown in the depicted example, control circuit 1013 forms part of integrated circuit 1014, which also includes switches 1015, 1016 and 1017. Functionally, the operation of discharge circuit 1004 is, in one example, very similar to the discharge circuits 104 and 204 described above with respect to FIGS. 1 and 2, respectively. In an example practical realization of power converter 1000, the integration of discharge circuit 1004 in this way can offer cost and printed circuit board area savings. It is appreciated that in other examples, discharge circuit 1004 could be integrated with PFC controller 1009. In general, discharge circuit 1004 could be integrated with any controller circuit such as an LLC converter, full and half bridge converters, SEPIC converters and CUK converters to name a few.

Figure 11:
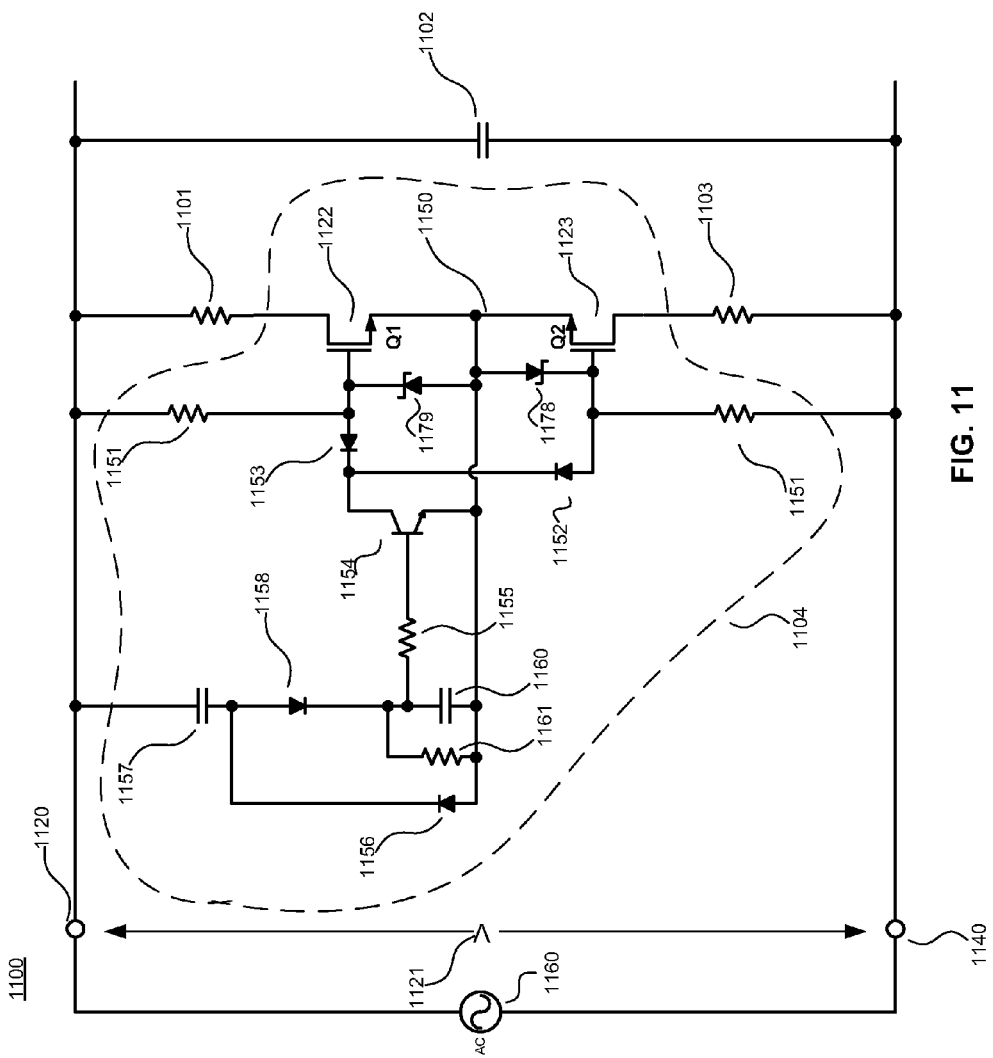
FIG. 11 is a schematic of an example discharge circuit to discharge a capacitance between power converter input terminals when a source of electrical energy is disconnected from the power converter input terminals in accordance with the teachings of the present invention.

FIG. 11 shows one example of a discrete component realization of a discharge circuit 1104 in accordance with the teachings of the present invention. As shown, capacitor 1157 and diodes 1156 and 1158 form a charge pump or capacitive dropper power supply that generates a voltage across capacitor 1160 when ac electrical energy source 1160 is coupled to input terminals 1120 and 1140. Current therefore flowing through resistor 1155 and into base of transistor 1154, holds transistor 1154 in an on state while electrical energy source 1160 remains coupled to input terminals 1120 and 1140. The gates of MOSFETs 1122 and 1123 are coupled to the collector of transistor 1154 through diodes 1152 and 1153. This ensures that the gate voltage of MOSFETs 1122 and 1123 relative to circuit ground 1150 is below the gate threshold voltage of the MOSFETs and that the MOSFETs 1122 and 1123 are in an off state when transistor 1154 is in an on state. If, however, ac electrical energy source 1160 is uncoupled from input terminals 1120 and 1140, the charge pump circuit no longer provides energy to capacitor 1160 and capacitor 1160 discharges at rate set by the RC time constant of resistors 1161 and 1155, and capacitor 1160.

After an extended period of time, which in one example could be approximately 20 milliseconds, selected through the choice of component values for capacitor 1160, and resistors 1155 and 1161, transistor 1154 turns off. At this time, depending on the polarity of the voltage across capacitor 1102, the gate voltage of either MOSFET 1122 or MOSFET 1123 rises to the gate voltage threshold and is eventually clamped by either zener 1178 or zener 1179.

In an example where the voltage on input terminal 1120 is higher than the voltage on input terminal 1140, the gate of 1122 will be pulled high turning MOSFET 1122 on. Current will then flow from capacitor 1102, through resistor 1101, through the channel of MOSFET 1122, through the body diode of MOSFET 1123 (which is an inherent part of the semiconductor structure of MOSFET 1123 as will be known to one skilled in the art), through resistor 1103 and then back to capacitor 1102, thus forming a discharge current path in accordance with the teachings of the present invention. When the voltage across capacitor 1102 reaches a lower threshold value, below which the gate voltage of 1122 falls below the gate threshold voltage of 1122, the MOSFET 1122 turns off and a residual voltage typically in the range of 5 to 10 volts depending on the type of MOSFET used for 1122, will remain on capacitor 1102.

Figure 12:
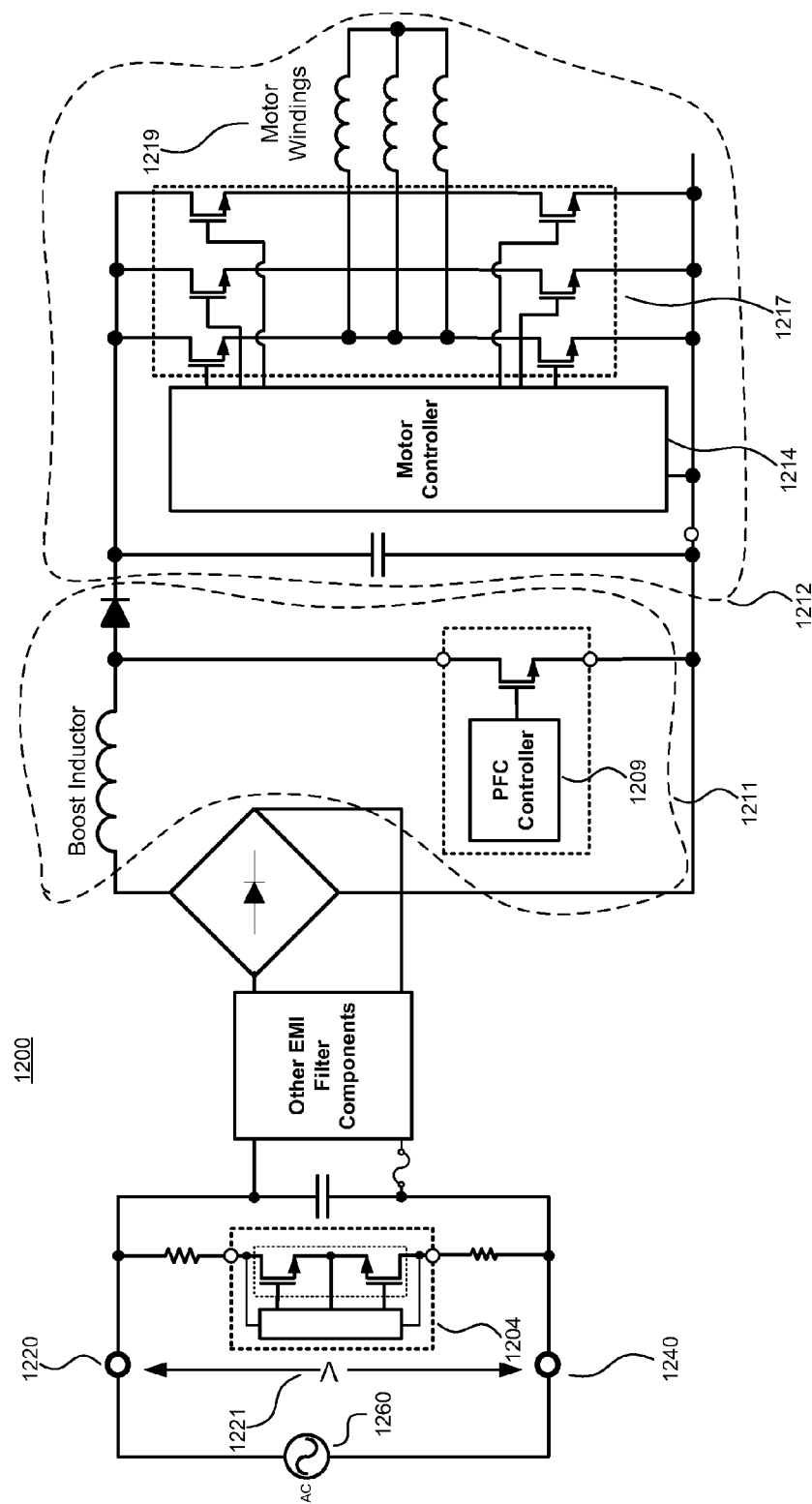
FIG. 12 is a schematic illustrating an example motor control power converter system employing a discharge circuit to discharge a capacitance between a power converter input terminals when a source of electrical energy is disconnected from the power converter input terminals in accordance with the teachings of the present invention.

It is noted that the descriptions above have been focused on power converters for explanation purposes where input and output energy is primarily electrical. FIG. 12 shows an example of a motor control power converter or power system where input power and energy is electrical, but is converted to primarily mechanical energy and power at the output. In the illustrated example, it is appreciated that the discharge circuit 1204 shares many similarities in feature and functions with control circuits 104 and 204 described above. Although the example depicted in FIG. 12 illustrates the use of a boost converter 1211, it is appreciated that in other examples, the inclusion of a power conversion stage 1211 would not necessarily be required in accordance with the teachings of the present invention. It is appreciated that in other examples, discharge circuit 1204 could be integrated within motor controller 1214 or even the power switch circuit 1217 that is coupled to motor windings 1219. It is appreciated that in other examples, the power system could be one where the input power and energy is electrical but is converted at the output of the power system to primarily optical or light output energy, such as for example in an LED driver power system.

Figure 13:
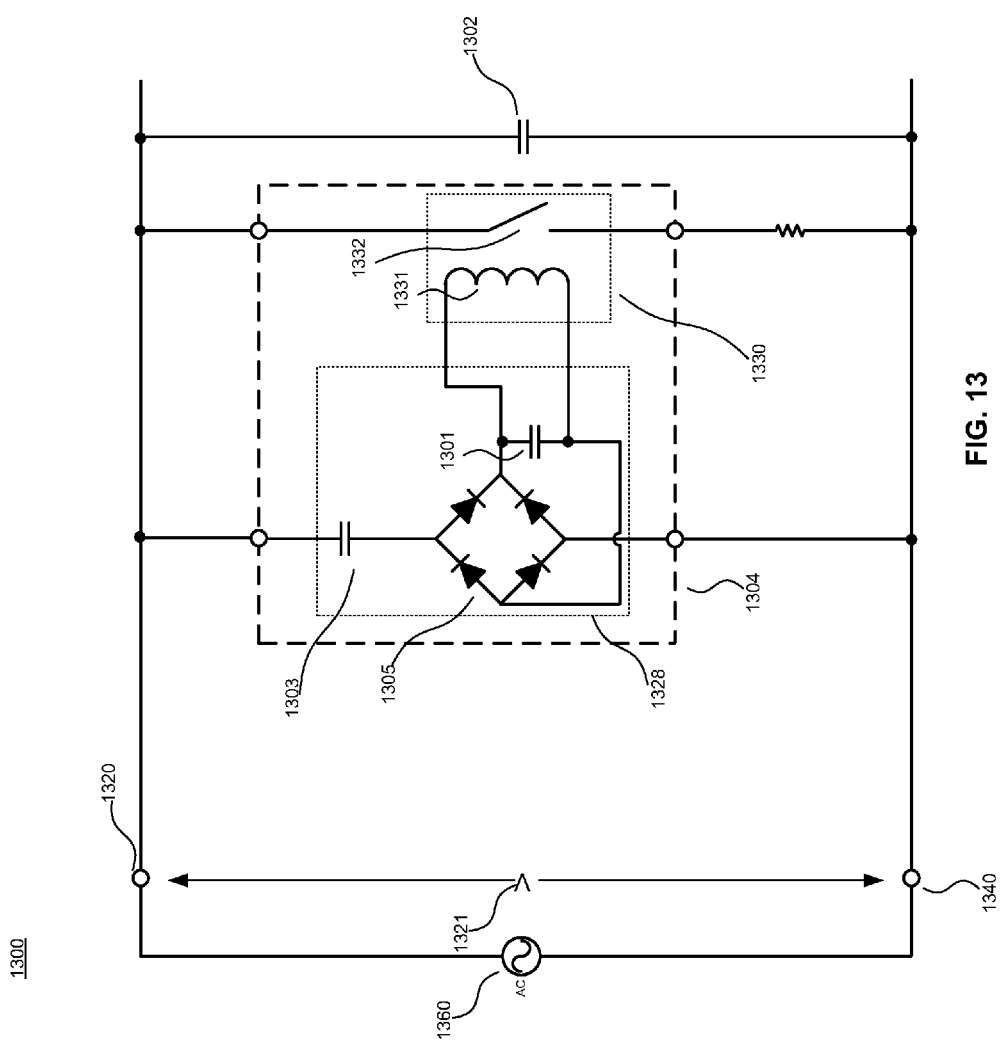
FIG. 13 shows a schematic diagram of another example discharge circuit to discharge a capacitance between power converter input terminals when a source of electrical energy is disconnected from the power converter input terminals in accordance with the teachings of the present invention.

FIG. 13 shows a schematic of another example of a discharge circuit to discharge a capacitance between input terminals of a power converter when a source of electrical energy is disconnected from the power converter input terminals in accordance with the teachings of the present invention. Electrical energy source 1360, which in the example is an ac voltage source, is coupled to input terminals 1320 and 1340. As illustrated in the depicted example, while ac voltage source 1360 is coupled to input terminals 1320 and 1340, current flows in capacitor 1303, through rectifier bridge 1305 and provides a current in a winding 1331 of relay 1330. In the example, relay 1330 is a normally closed type where the relay switch 1332 is open when current flows in winding 1330. When energy source 1360 is uncoupled from terminals 1320 and 1340, current ceases to flow in capacitor 1303 and rectification bridge 1305. The current flowing in winding 1331 then falls to substantially zero in a time determined by the value of capacitor 1301. When the current in winding 1331 falls below a threshold level, switch 1332 then closes and discharges capacitor 1302. In one example, current limiting resistors could be coupled in series with switch 1332 to limit peak currents in switch 1332 when the electrical energy source is first coupled to the input terminals and when the switch is closed to discharge capacitor 1302.

In general is it appreciated that all the teachings of the present invention discussed above with respect to FIGS. 1 to 13 can be applied to any system coupled to a source of electrical energy where the capacitance coupled between input terminals of the circuit poses a risk of electrical shock if left charged when the source of electrical energy is uncoupled from the input to the system.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power converter, comprising:
    an energy transfer element coupled between an input of the power converter and an output of the power converter; and
    a circuit coupled to the input of the power converter, wherein the circuit further comprises:
        a control circuit capable of detecting whether an AC voltage source is coupled to the input of the power converter; and
        a switch coupled to the control circuit,
        wherein the control circuit is capable of detecting whether the AC voltage source is uncoupled from the input of the power converter within a first predetermined maximum period of time,
        wherein the control circuit is coupled to drive the switch in a first operating mode when the AC voltage source is coupled to the input of the power converter,
        wherein the control circuit is coupled to drive the switch in a second operating mode when the control circuit detects the AC voltage source is uncoupled from the input of the power converter and is capable of discharging a capacitance coupled between input terminals of the power converter to a threshold voltage level through a discharge path and through the switch within a second predetermined maximum period of time, and
        wherein an RC time constant of the discharge path is less than or equal to one second and the threshold voltage level is less than or equal to ten volts.

2. The power converter of claim 1, wherein the switch is coupled to provide a starting current for operation of the circuit during a start up phase of the circuit.

3. The power converter of claim 2, wherein the starting current flows through the switch.

4. The power converter of claim 2, wherein the switch comprises a first transistor coupled to a second transistor, and one of the first and second transistors is turned on to provide the starting current.

5. The power converter of claim 4, wherein one of the first and second transistors is turned on to discharge the capacitance.

6. The power converter of claim 1, wherein the capacitance coupled between the input terminals of the input of the power converter comprises one or more X capacitors.

7. The power converter of claim 1, wherein the control circuit and the switch are included in an integrated circuit.

8. A power converter, comprising:
    an energy transfer element coupled between an input of the power converter and an output of the power converter; and
    a circuit coupled to the input of the power converter, wherein the circuit further comprises:
        a control circuit capable of detecting whether an AC voltage source is coupled to the input of the power converter; and
        a bidirectional switch comprising a first transistor coupled to a second transistor, the bidirectional switch further coupled to the control circuit,
        wherein the control circuit is capable of detecting whether the AC voltage source is uncoupled from the input of the power converter within a first predetermined maximum period of time,
        wherein the control circuit is coupled to drive the bidirectional switch in a first operating mode when the AC voltage source is coupled to the input of the power converter,
        wherein the control circuit is coupled to drive the bidirectional switch in a second operating mode when the control circuit detects the AC voltage source is uncoupled from the input of the power converter, and is capable of discharging a capacitance coupled between input terminals of the power converter to a threshold voltage level through a discharge path and through the bidirectional switch within a second predetermined maximum period of time, and
        wherein an RC time constant of the discharge path is less than or equal to one second and the threshold voltage level is less than or equal to ten volts.

9. The power converter of claim 8, wherein the bidirectional switch is coupled to provide a starting current for operation of the circuit during a start up phase of the circuit.

10. The power converter of claim 9, wherein one of the first and second transistors of the bidirectional switch is turned on to provide the starting current.

11. The power converter of claim 10, wherein the starting current flows through one of the first and second transistors of the bidirectional switch.

12. The power converter of claim 8, wherein one of the first and second transistors of the bidirectional switch is turned on to discharge the capacitance.

13. The power converter of claim 8, wherein the capacitance coupled between the input terminals of the input of the power converter comprises one or more X capacitors.

14. The power converter of claim 8, wherein the control circuit and the bidirectional switch are included in an integrated circuit.

15. A power converter, comprising:
    an energy transfer element coupled between an input of the power converter and an output of the power converter; and
    a circuit coupled to the input of the power converter, wherein the circuit further comprises:
        a control circuit capable of detecting whether an AC voltage source is coupled to the control circuit by determining whether a voltage of the AC voltage source has reversed in polarity; and a switch coupled to the control circuit, wherein the control circuit is capable of detecting whether the AC voltage source is uncoupled from the input of the power converter within a first predetermined maximum period of time, wherein the control circuit is coupled to drive the switch in a first operating mode when the AC voltage source is coupled to the control circuit, wherein the control circuit is coupled to drive the switch in a second operating mode when the control circuit detects the AC voltage source is uncoupled from the control circuit to discharge a capacitance coupled between input terminals of the power converter to a threshold voltage level through a discharge path and through the switch within a second predetermined maximum period of time, and wherein an RC time constant of the discharge path is less than or equal to one second and the threshold voltage level is less than or equal to ten volts.

16. The power converter of claim 15, wherein the switch is coupled to provide a starting current for operation of the circuit during a start up phase of the circuit.

17. The power converter of claim 16, wherein the starting current flows through the switch.

18. The power converter of claim 15, wherein the capacitance coupled between the input terminals of the input of the power converter comprises one or more X capacitors.

19. The power converter of claim 15, wherein the control circuit and the switch are included in an integrated circuit.

20. The power converter of claim 15, wherein the control circuit detects whether the AC voltage source is coupled to the control circuit by determining whether the voltage of the AC voltage source has reversed in polarity within a third predetermined period of time.

* * * * *